United States Patent
Lawlor et al.

(10) Patent No.: US 7,310,178 B2
(45) Date of Patent: Dec. 18, 2007

(54) REARVIEW MIRROR ASSEMBLY FOR A VEHICLE

(75) Inventors: Patrick J Lawlor, Dublin (IE); Niall R Lynam, Holland, MI (US); John P Desmond, Newbridge (IE); Patrick J Dowling, Athy (IE)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 11/738,649

(22) Filed: Apr. 23, 2007

(65) Prior Publication Data

US 2007/0188844 A1 Aug. 16, 2007

Related U.S. Application Data

(63) Continuation of application No. 11/498,420, filed on Aug. 3, 2006, now Pat. No. 7,209,278, which is a continuation of application No. 10/512,206, filed as application No. PCT/IE03/00059 on Apr. 25, 2003, now Pat. No. 7,110,156.

(30) Foreign Application Priority Data

| Apr. 26, 2002 | (IE) | ............................... S2002/0314 |
| Jul. 1, 2002 | (IE) | ............................... S2002/0545 |

(51) Int. Cl.
*G02F 1/153* (2006.01)
*G02F 1/15* (2006.01)
*G01J 1/32* (2006.01)
*G08B 5/00* (2006.01)
*F21V 33/00* (2006.01)
*B60Q 1/26* (2006.01)

(52) U.S. Cl. ................. 359/267; 359/265; 359/601; 359/603; 359/604; 362/140; 362/494; 340/815.4; 250/205

(58) Field of Classification Search ............... 359/265, 359/267, 601, 603, 604, 606; 362/135, 140, 362/141, 494, 503; 340/438, 815.4; 250/205
See application file for complete search history.

(56) References Cited

U.S. PATENT DOCUMENTS 4,012,022 A 3/1977 Tomita ....................... 248/475

(Continued)

OTHER PUBLICATIONS

International Search Report in PCT Appln. No. PCT/IE03/00059, International filing date Apr. 25, 2003.

(Continued)

*Primary Examiner*—Loha Ben
(74) *Attorney, Agent, or Firm*—Van Dyke, Gardner, Linn & Burkhart, LLP

(57) ABSTRACT

An interior rearview mirror assembly for a vehicle comprises an electro-optic mirror unit whose reflectivity is variable in response to an electrical voltage applied thereto. The mirror unit includes a first substrate and a second substrate with an electro-optic medium sandwiched therebetween. The second substrate includes a recess at a perimeter region thereof. The mirror assembly includes at least one light sensor disposed behind the first substrate of the mirror unit and generally at the recessed perimeter region of the second substrate. The at least one light sensor is operable to receive light through the first substrate and unobstructed by the second substrate of the mirror unit. The light may be received through a bezel of the mirror assembly and through the first substrate and unobstructed by the second substrate.

20 Claims, 20 Drawing Sheets

U.S. PATENT DOCUMENTS

| | | | |
|---|---|---|---|
| 4,524,941 A | 6/1985 | Wood et al. | 248/544 |
| 4,623,222 A | 11/1986 | Itoh et al. | 349/195 |
| 4,721,364 A | 1/1988 | Itoh et al. | 349/195 |
| 4,936,533 A | 6/1990 | Adams et al. | 248/222.1 |
| 5,058,851 A | 10/1991 | Lawlor et al. | 248/549 |
| 5,140,455 A | 8/1992 | Varaprasad et al. | 359/275 |
| 5,151,816 A | 9/1992 | Varaprasad et al. | 359/275 |
| 5,572,354 A | 11/1996 | Desmond et al. | 359/265 |
| 5,659,423 A * | 8/1997 | Schierbeek et al. | 359/604 |
| 5,669,698 A * | 9/1997 | Veldman et al. | 362/494 |
| 5,910,854 A | 6/1999 | Varaprasad et al. | 359/273 |
| 5,938,321 A | 8/1999 | Bos et al. | 362/494 |
| 5,971,553 A | 10/1999 | Durnwald | 359/871 |
| 6,023,229 A * | 2/2000 | Bugno et al. | 340/693.5 |
| 6,087,953 A | 7/2000 | DeLine et al. | 340/815.4 |
| 6,124,886 A * | 9/2000 | DeLine et al. | 348/148 |
| 6,222,460 B1 | 4/2001 | DeLine et al. | 340/815.4 |
| 6,245,262 B1 | 6/2001 | Varaprasad et al. | 264/1.31 |
| 6,326,613 B1 | 12/2001 | Heslin et al. | 250/239 |
| 6,329,925 B1 | 12/2001 | Skiver et al. | 340/815.4 |
| 6,386,742 B1 * | 5/2002 | DeLine et al. | 362/494 |
| 6,447,124 B1 | 9/2002 | Fletcher et al. | 359/604 |
| 6,483,438 B2 | 11/2002 | DeLine et al. | 340/815.4 |
| 6,501,387 B2 | 12/2002 | Skiver et al. | 340/815.4 |
| 6,520,667 B1 | 2/2003 | Mousseau | 362/494 |
| 6,523,964 B2 | 2/2003 | Schofield et al. | 359/601 |
| 6,590,193 B2 * | 7/2003 | Schofield et al. | 250/205 |
| 6,593,565 B2 | 7/2003 | Heslin et al. | 250/239 |
| 6,672,744 B2 * | 1/2004 | DeLine et al. | 362/494 |
| 6,756,912 B2 | 6/2004 | Skiver et al. | 340/815.4 |
| 6,774,356 B2 | 8/2004 | Heslin et al. | 250/239 |
| 6,848,817 B2 | 2/2005 | Bos et al. | 362/494 |
| 6,877,888 B2 * | 4/2005 | DeLine et al. | 362/494 |
| 6,902,284 B2 | 6/2005 | Hutzel et al. | 359/865 |
| 7,012,543 B2 | 3/2006 | DeLine et al. | 340/815.45 |
| 7,012,727 B2 | 3/2006 | Hutzel et al. | 359/265 |
| 7,064,310 B2 * | 6/2006 | Schofield et al. | 250/205 |
| 7,108,409 B2 * | 9/2006 | DeLine et al. | 362/494 |
| 7,110,156 B2 | 9/2006 | Lawlor et al. | 359/265 |
| 7,209,278 B2 | 4/2007 | Lawlor et al. | 359/265 |
| 7,255,451 B2 * | 8/2007 | McCabe et al. | 359/605 |
| 7,255,465 B2 * | 8/2007 | DeLine et al. | 362/494 |
| 2005/0024729 A1 * | 2/2005 | Ockerse et al. | 359/603 |

OTHER PUBLICATIONS

N.R. Lynam, "Electrochromic Automotive Day/Night Mirrors", SAE Technical Paper Series, (870636)(1987).

* cited by examiner

REARVIEW MIRROR ASSEMBLY FOR A VEHICLE

CROSS REFERENCE TO RELATED APPLICATIONS

This is a continuation of U.S. patent application Ser. No. 11/498,420, filed Aug. 3, 2006, entitled A REARVIEW MIRROR ASSEMBLY FOR A VEHICLE, by Lawlor et al., now U.S. Pat. No. 7,209,278, which is a continuation of U.S. patent application Ser. No. 10/512,206, filed Oct. 22, 2004, now U.S. Pat. No. 7,110,156, which corresponds to PCT/IE03/00059, which claims priority of Irish patent application No. S2002/0545, filed Jul. 1, 2002, and Irish patent application No. S2002/0314, filed Apr. 26, 2002, the disclosures of which are hereby incorporated by reference herein.

The present invention relates to rearview mirror assemblies, for example electro-optic rearview mirror assemblies in which two glass plates sandwich an electro-optic medium.

Electro-optic rearview mirrors are well known in the art; see for example U.S. Pat. Nos. 5,140,455, 5,151,816 and 5,659,423 and the following paper: N. R. Lynam, "Electrochromic Automotive Day/Night Mirrors", SAE Technical Paper Series, (870636) (1987).

Brackets for supporting rearview mirrors are well known in the art; see for example U.S. Pat. Nos. 4,936,533, 5,058,851, 4,524,941 and 4,012,022. Rearview mirrors in many instances are mounted to the brackets by means of a ball and socket connection.

Electro-optic and in particular electro-chromic (EC) mirrors are now in general usage in vehicles at the upper end of the market. The EC mirrors are relatively expensive and their cost can make them prohibitive for motor vehicles at the medium and lower end of the market. Such EC mirrors however confer considerable advantages over known prismatic mirrors and it is therefore desirable to reduce the cost of production of electro-optic mirrors so that they can be used in a broad range of vehicle types.

There is therefore a need for a rearview mirror that is economical to produce but which meets the expectations of the automobile market in terms of functional performance such as vibration, safety regulations, ease of assembly at an auto company in terms of bracket mounting, electrical connections and reliability.

These objects are achieved by the inventions claimed in one or more of the appended claims.

Embodiments of the invention will now be described, by way of examples with reference to the accompanying drawings, in which:

FIG. 15 is a cross-sectional view of the mirror unit and support arm of the assembly of FIG. 12 taken on the line A-A of FIG. 16a.

FIG. 16 is a cross-sectional view of the mirror assembly of FIG. 12 taken on the line B-B of FIG. 16a.

FIGS. 18(a)-(d) are schematic diagrams illustrating large area sheets of glass from which individual front and rear glass plates used in electro-optical mirror units are cut.

Figure 19:
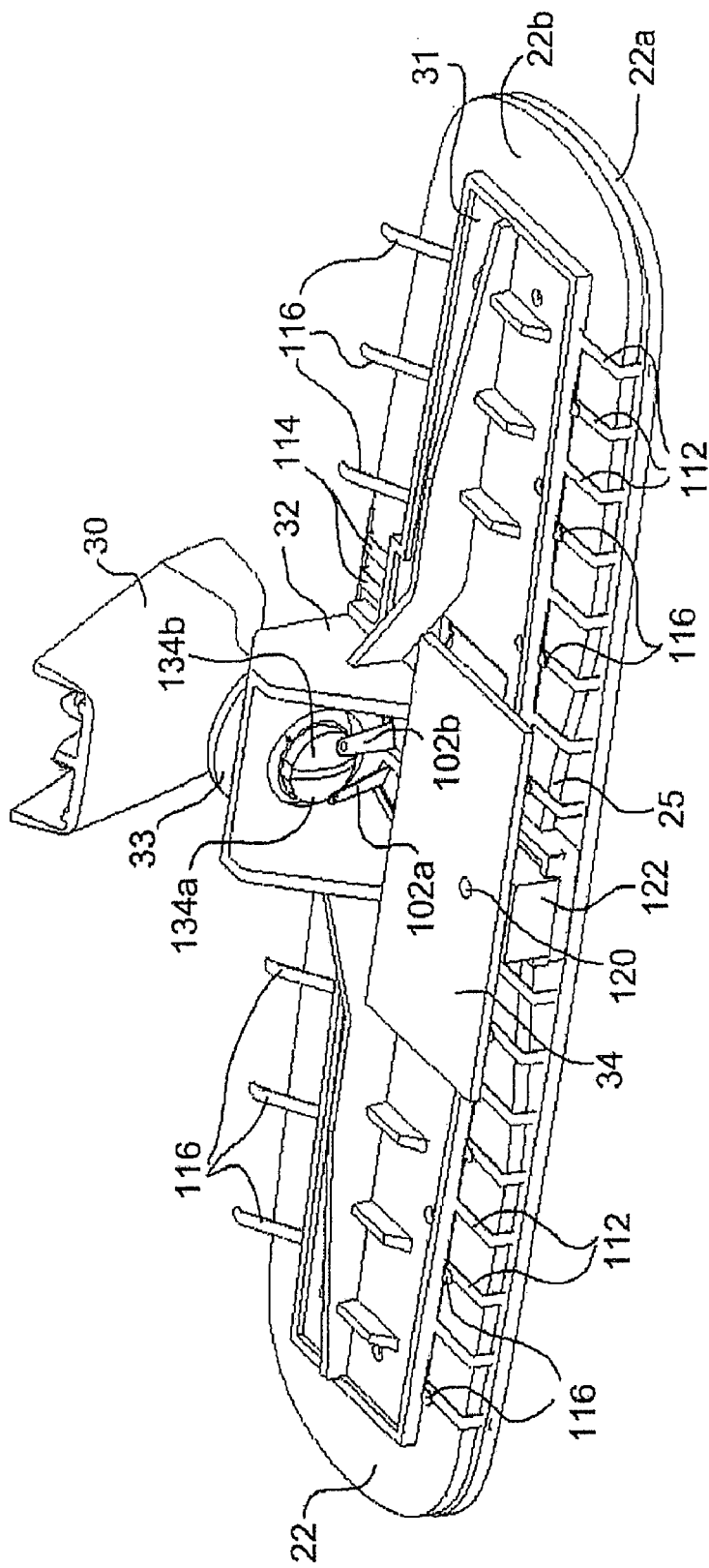

FIG. 19 is a rear perspective view of a still further embodiment of the invention, omitting the housing and bezel.

Figure 20:
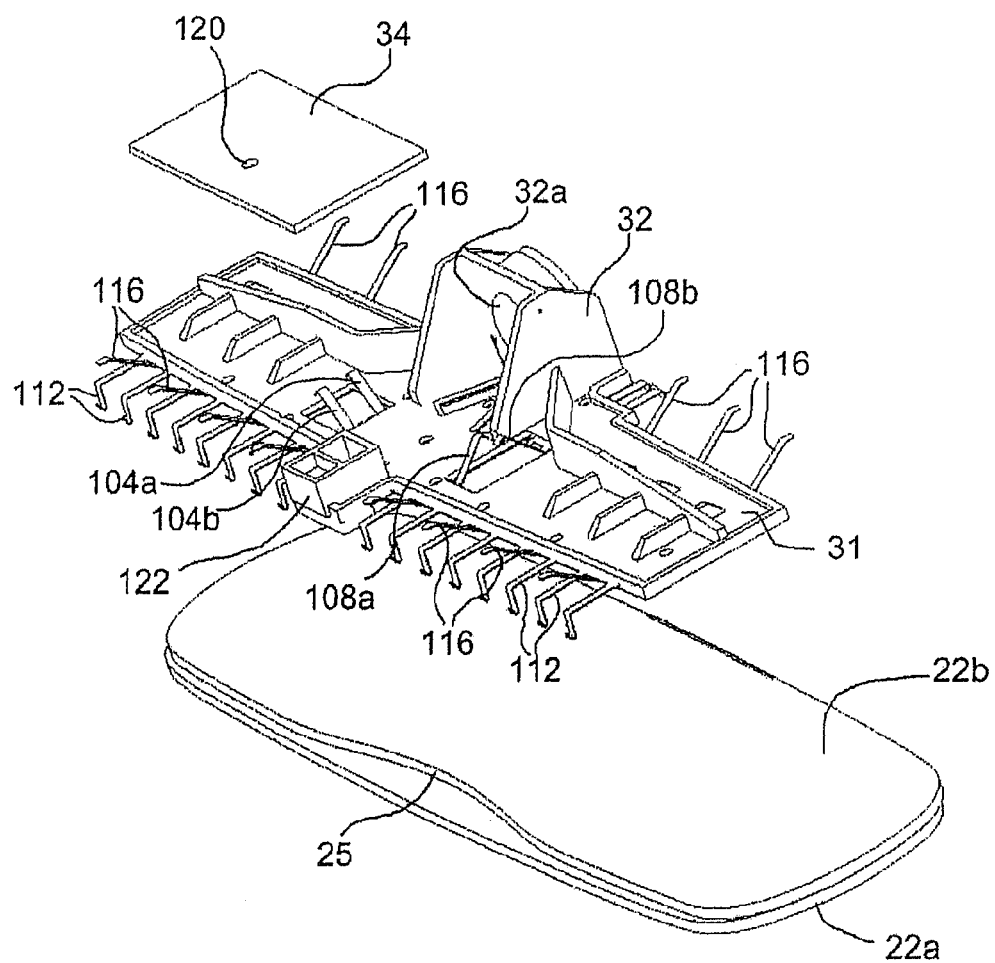

FIG. 20 is an exploded view of the embodiment of FIG. 19, omitting the bracket.

Figure 21:
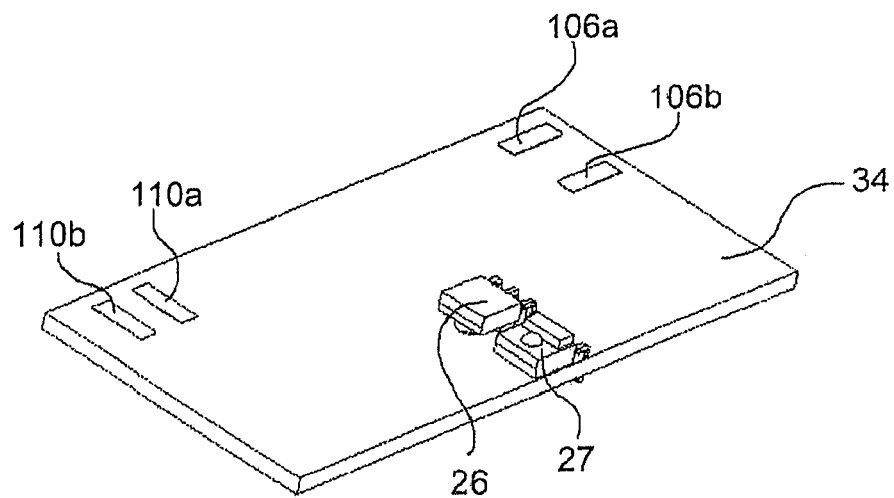

FIG. 21 shows the rear side (i.e. the side facing the backplate) of the PCB of FIGS. 19 and 20, omitting all the circuitry except the light sensors and contact strips.

Figure 22:
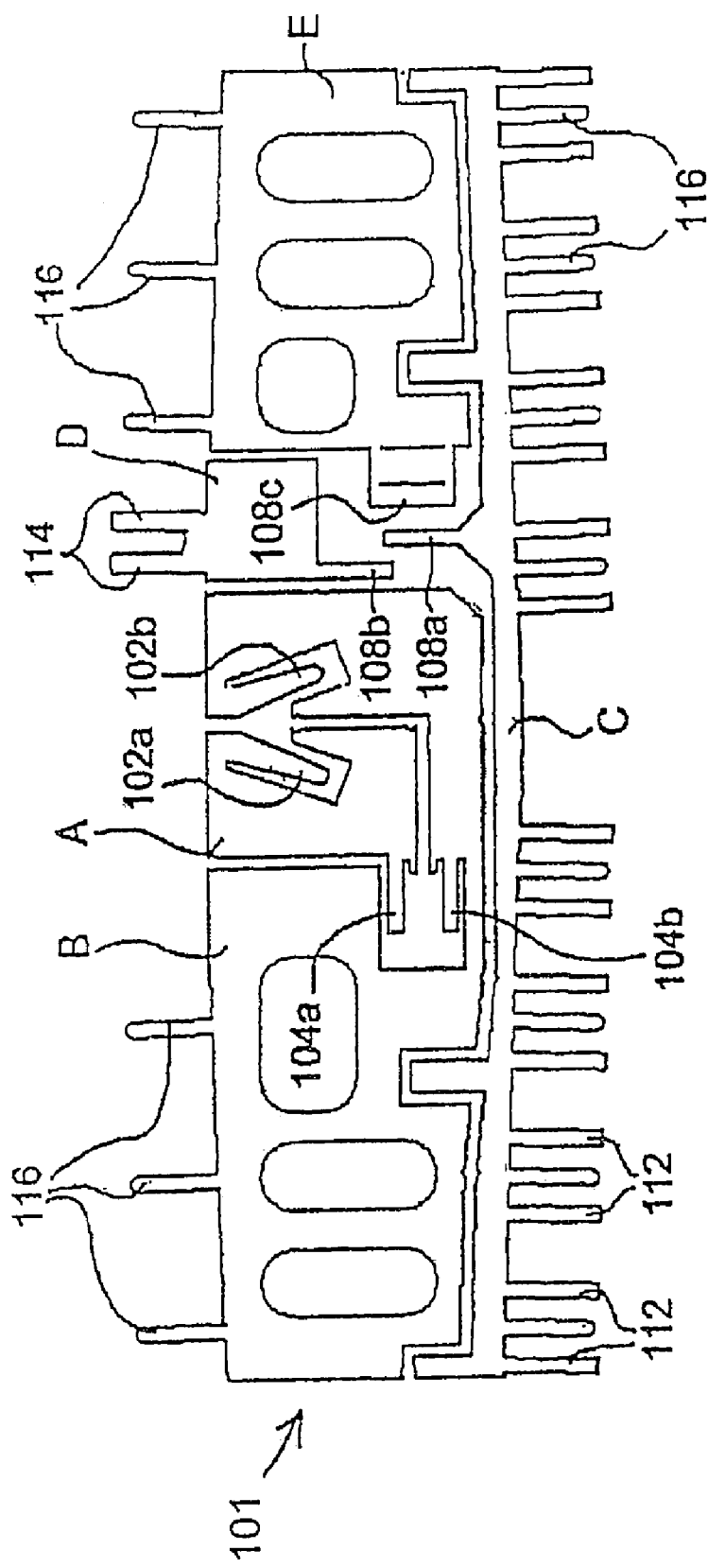

FIG. 22 is a plan view of a phosphor bronze lead frame embedded in the backplate of the embodiment of FIGS. 19 and 20.

FIGS. 23(a) to 23(c) are various perspective views of the support bracket of the embodiment of FIGS. 19 and 20.

Figure 23:
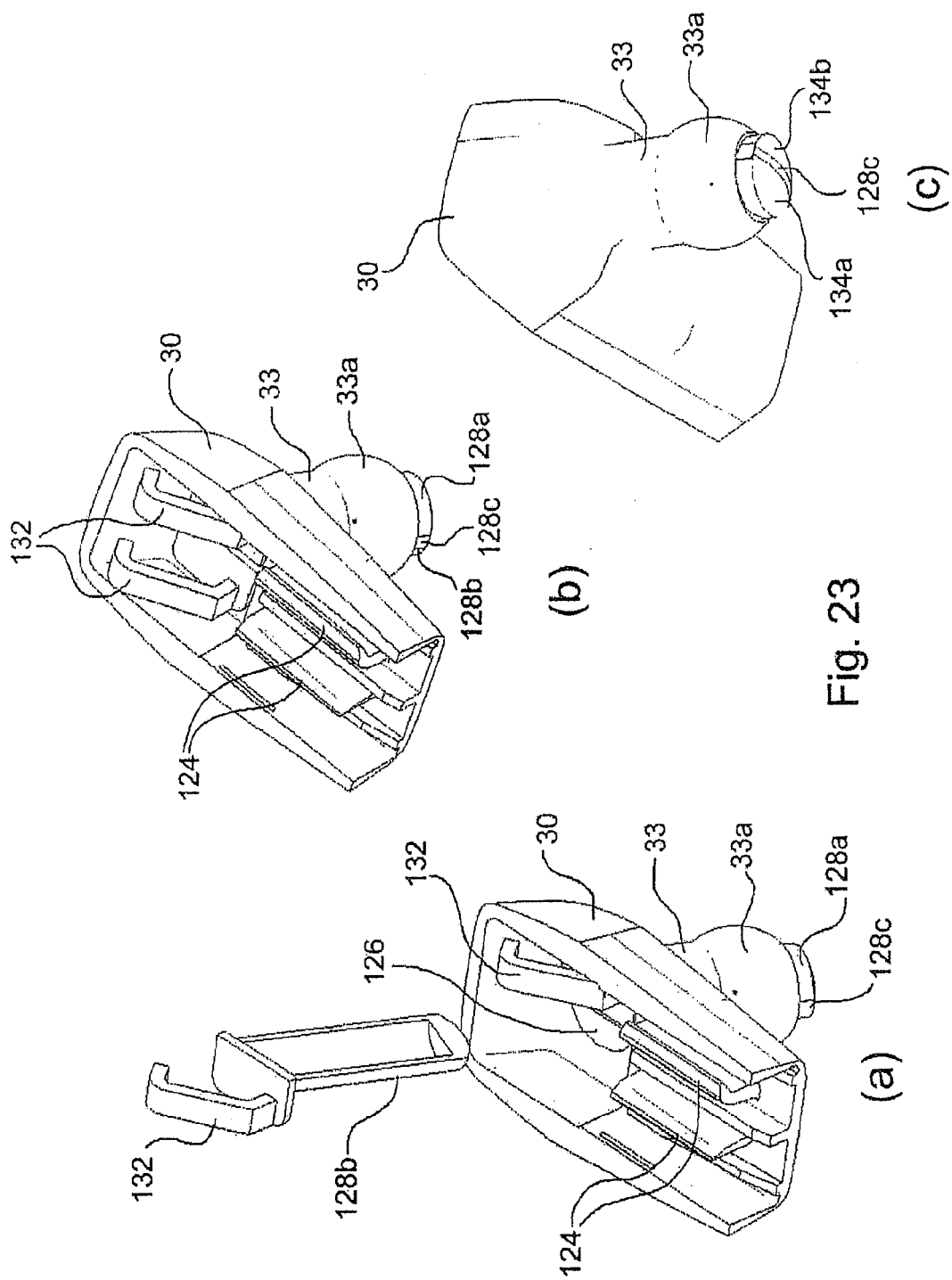

FIG. 24(a) is a side view of the bracket of FIG. 23.

FIG. 24(b) is a cross-section of the bracket of FIG. 23 taken on the line A-A of FIG. 24(a).

FIG. 24(c) is a cross-section of the bracket of FIG. 23 taken on the line B-B of FIG. 24(b).

FIGS. 25(a) and 25(b) are perspective views of a further embodiment of bracket which could be used in the embodiment of FIGS. 19 and 20.

Figure 26:
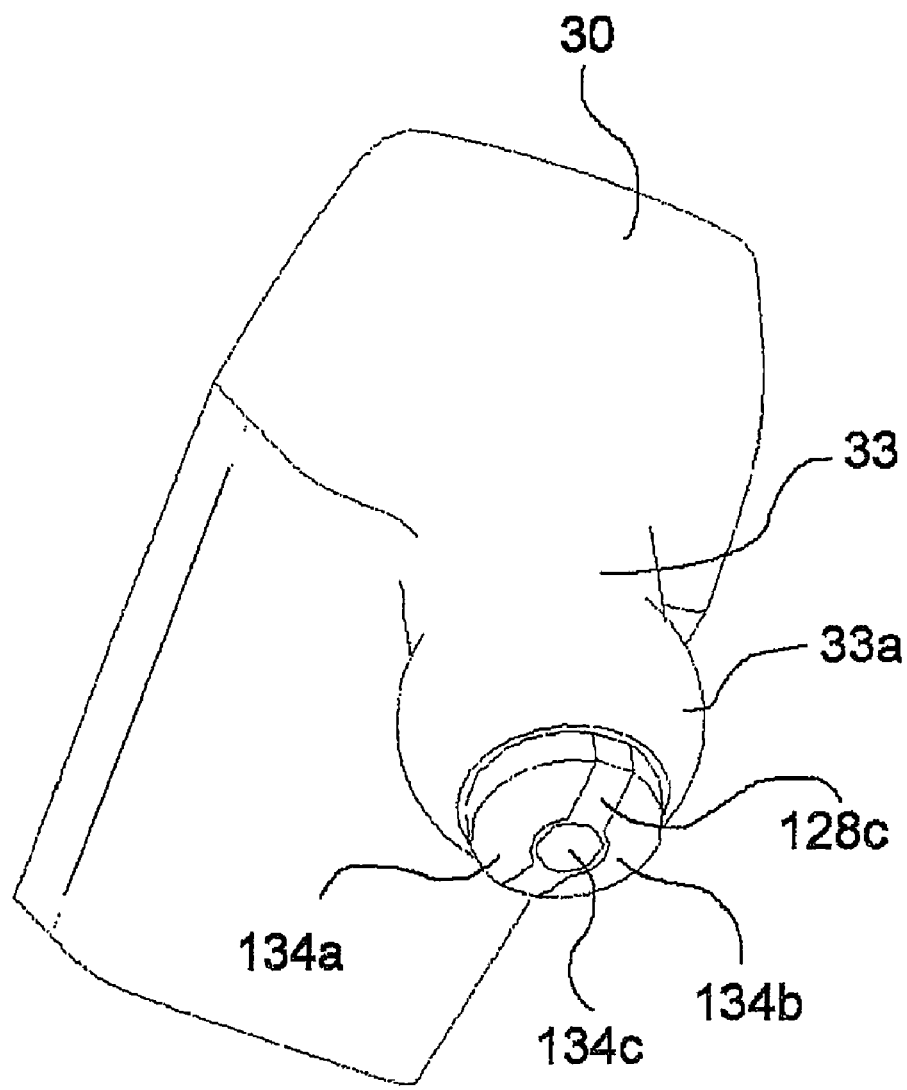

FIG. 26 is a perspective views of a still further embodiment of bracket which could be used in the embodiment of FIGS. 19 and 20.

As will be described in more detail, electro-optic mirror units comprise front and rear glass plates with an electro-optic medium sandwiched between them. The glass used in these units is highly specialised and expensive, and since the front and rear glass plates of an electro-optic mirror unit constitute a significant proportion of the costs of the overall mirror assembly it is very important to try to minimise wastage of glass from the plate glass from which the mirror glass profiles are cut. However, the problem is complicated by the fact that the transparent front TEC glass is provided in sheets of a different width from the sheets of the reflective rear ITO(Ag) glass, TEC and ITO(Ag) glasses being commercially available types of glass used in electro-optic mirror construction.

Figure 18:
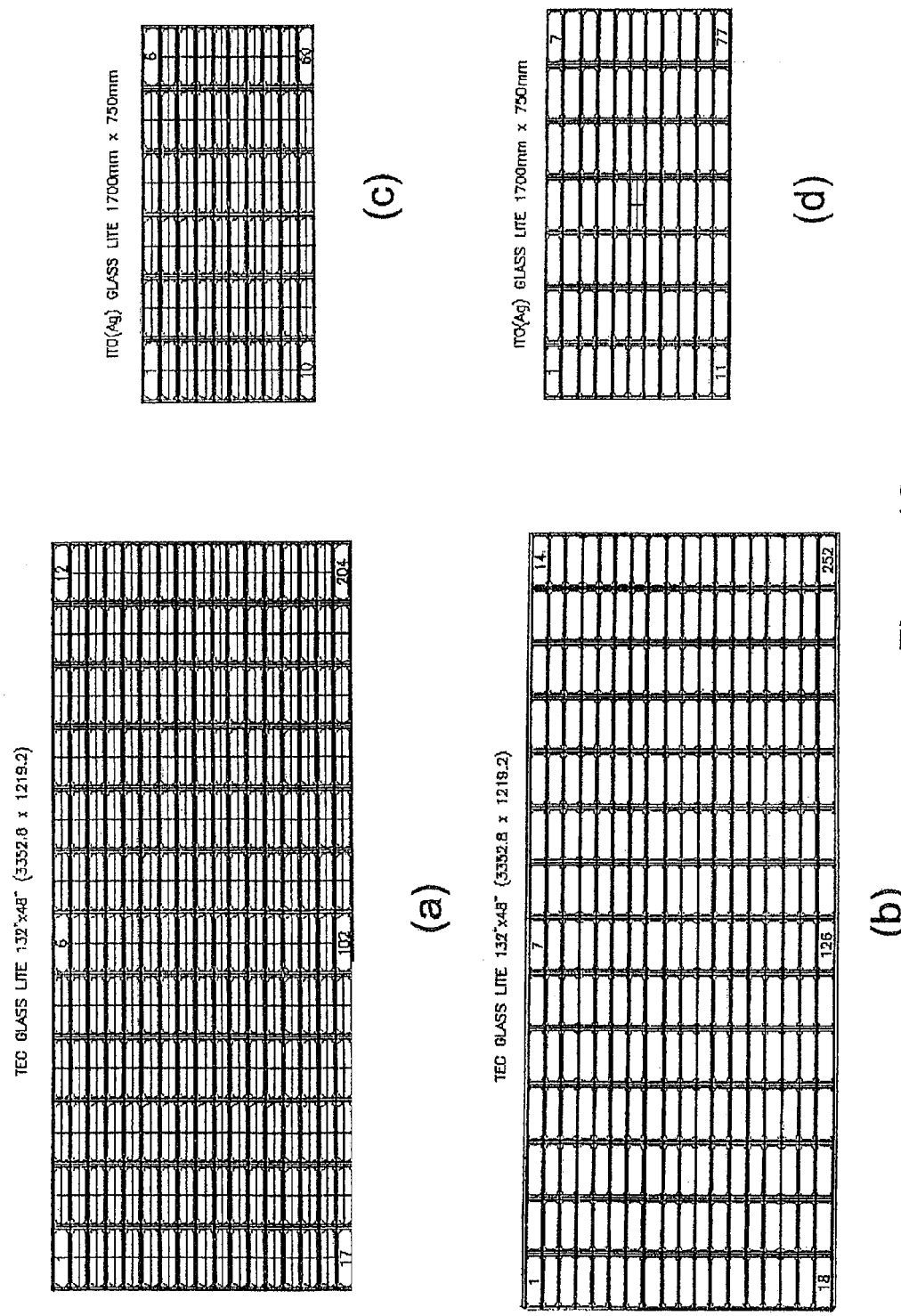

Referring initially to FIG. 18, FIG. 18(a) shows the number (204) of front glass plates conventionally cut from a standard sheet of TEC glass measuring 3352.8 mm×1219.2 mm, each glass plate being 249.5 mm wide by 65.7 mm high. By contrast, FIG. 18(b) shows the number (252) of front glass plates which may be produced from the same standard size sheet when each front glass plate is 219.4 mm wide and 61.5 mm high. This represents a 23% increase in the number of front glass plates available from the standard TEC glass sheet. Similarly, FIG. 18(c) shows that only 60 standard sized 249.5 mm wide by 65.7 mm high rear glass plates can be cut from a standard 1700 mm by 750 mm sheet of ITO(Ag) glass, whereas FIG. 18(d) shows that 77 rear glass plates of size 219.4 mm wide and 61.5 mm high can be cut from the same ITO(Ag) glass sheet. This represents a 28% increase in the number of rear glass plates available from the standard ITO(Ag) glass sheet.

It has therefore been discovered that optimum usage of both the front and rear glass sheets is obtained by using front and rear mirror glass plates of size 219.4 mm by 61.5 mm. These are therefore the sizes of front and rear glass plates used in the various embodiments, except where otherwise noted. This minimises wastage and leads to optimum cost efficiency. In determining these sizes it has also been determined that in terms of a low cost electro-optic mirror the size of the mirror face is in fact larger than the average size of a prismatic type mirror face. Thus, the invention not only provides optimum efficiency in terms of glass usage and thus cost reduction by minimising wastage, but it also provides, a larger more effective mirror than the prismatic type mirror which it will replace.

Referring now to FIGS. 1 to 7 and 7a, a rear view mirror assembly 20 comprises a housing 21 containing an electro-optic mirror unit 22, a bezel 23 which retains the mirror unit 22 in the housing, the mirror unit 22 being located just behind the bezel 23 and being viewable through the opening in the bezel, and a support bracket 30 for attaching the assembly to the interior cabin of a vehicle, for example to the top of the windscreen or the header. In the present embodiment the upper end of the bracket 30 is adapted for sliding engagement with a mirror mount 100, often referred to as a "button", which is adhesively attached to the interior surface of the windscreen in known manner.

Electro-optic mirror units are well-known in the art and typically comprise front and rear glass plates 22a, 22b respectively (FIG. 7) with a layer of an electro-optic medium (not shown) sandwiched between them. The front plate 22a is transparent and the rear plate 22b has a layer of silver or other reflective material on its inside surface. The unit 22 is positioned in the housing 21 with the front plate 22a exposed through the bezel opening so that the reflective layer on the rear plate 22b is viewed through the front plate and the layer of electro-optic medium. The inside surface of each plate bears an electrically conductive electrode layer, the electrode layer on the front plate being transparent and the electrode layer on the rear plate also being transparent, at least if it is in front of the reflective layer (alternatively the reflective layer may also constitute the electrode layer for the rear plate so avoiding the need for a separate electrode layer on the rear plate). The light transmissivity of the electro-optic medium, and hence the reflectivity of the mirror unit, can be varied by the application of a variable control voltage across the electro-optic medium, i.e. across the conductive electrode layers on the inside surfaces of the plates. The electro-optic medium may comprise any material, for example electro-chromic or liquid crystal, which has the desired electro-optic properties.

The electro-optic mirror unit 22 is preferably an electro-chromic (EC) cell either of the solid state type or electro-chemichromic type, but may be any desired form of cell. In the present embodiments the mirror unit 22 is an EC cell whose front plate 22a comprises TEC glass and whose rear plate 22b comprises ITO(Ag) glass. The electro-optic medium sandwiched between the plates 22a, 22b is a self-supporting solid polymer matrix (SPM). The construction of EC cells is well known in the art and is described for example in the prior art documents noted above or in U.S. Pat. No. 5,572,354 the contents of which are incorporated herein by reference. However, this and following embodiments are not limited to the use of any particular types of glass, any particular type of electro-optic medium or any particular type of electro-optic mirror unit.

Figure 6:
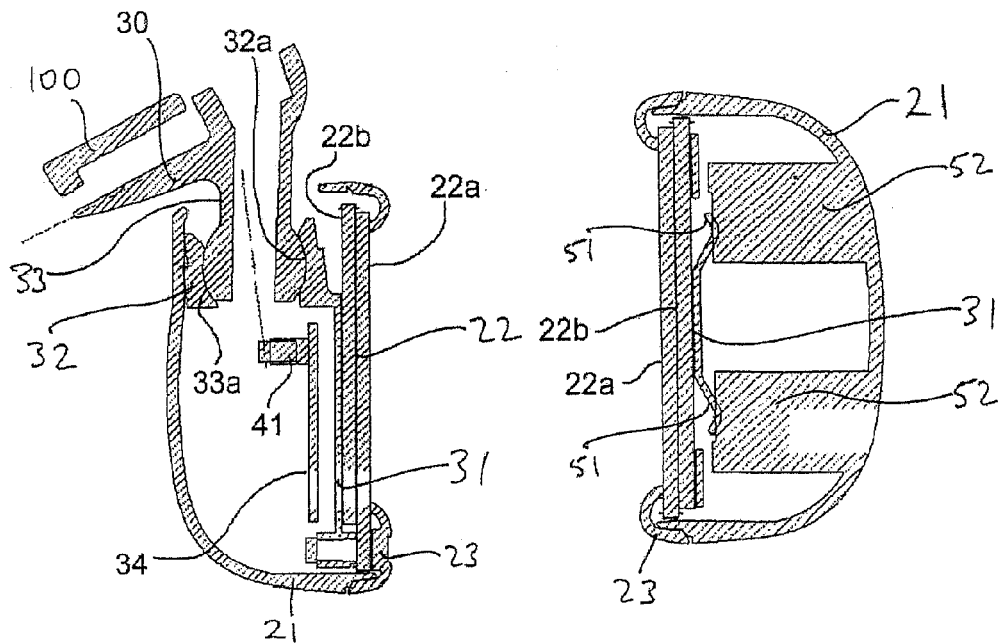
FIGS. 6 and 7 are cross sectional views of the mirror of FIG. 1.
Figure 7:
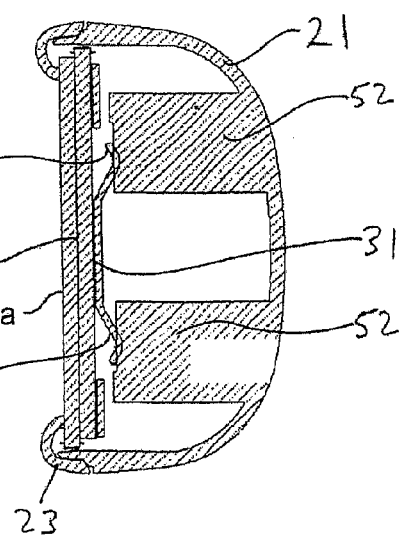
Figure 7A:
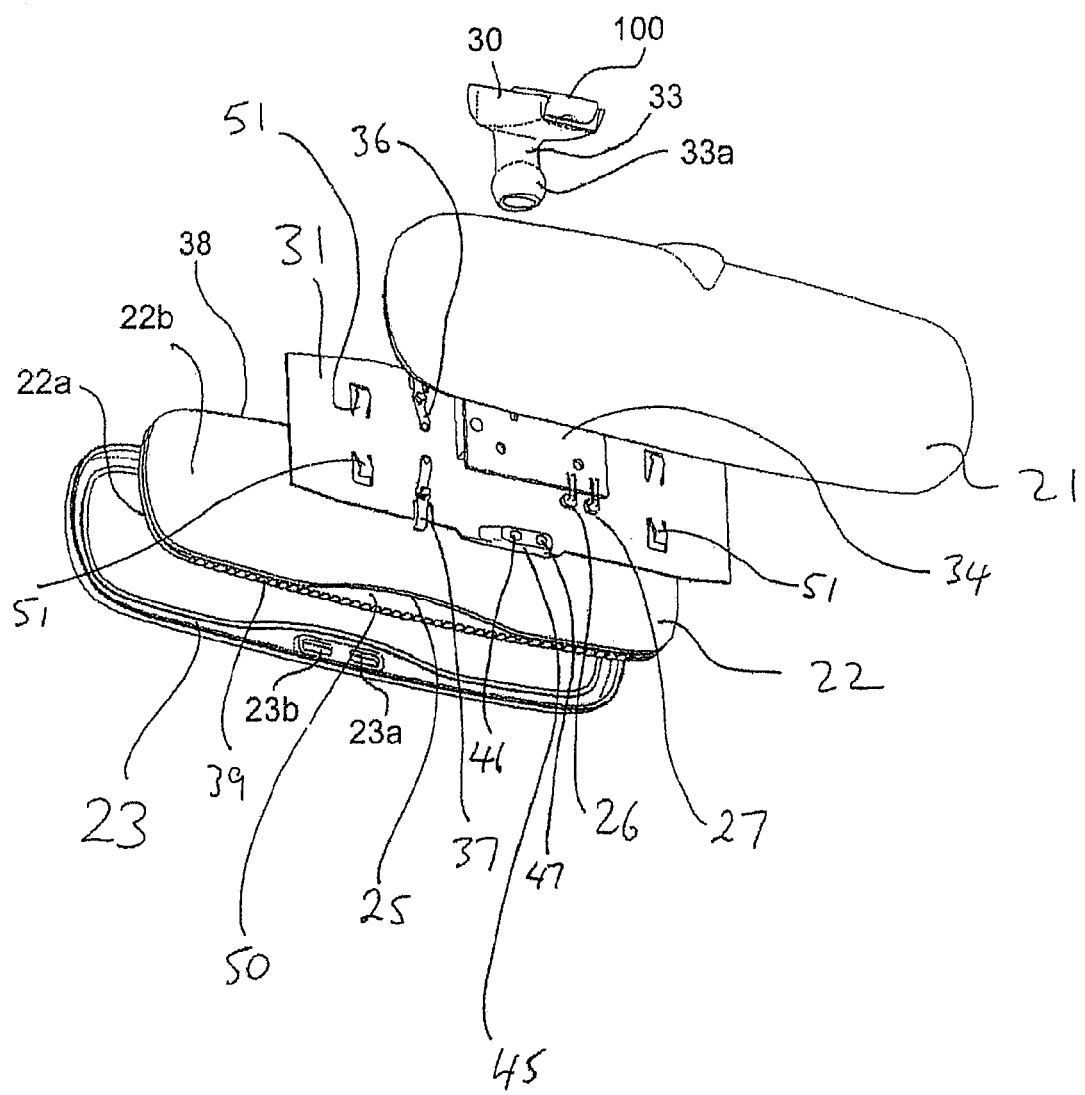
FIG. 7a is an exploded rear perspective view of the mirror of FIG. 1.
Figure 8:
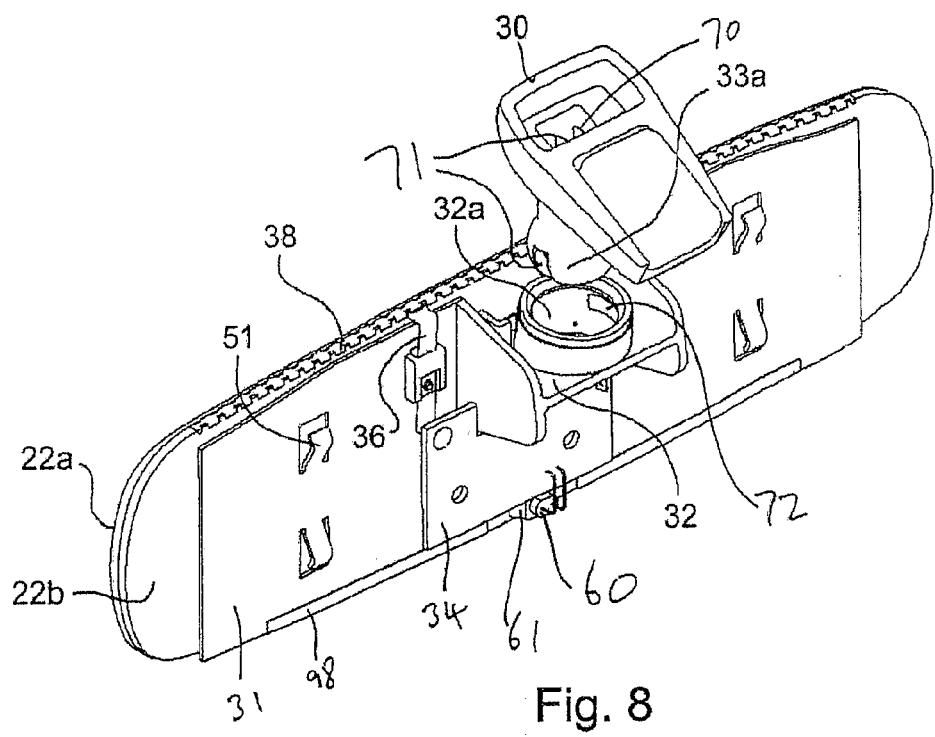
FIGS. 8 and 9 are rear perspective views of another embodiment of the invention, omitting the mirror housing.
Figure 9:
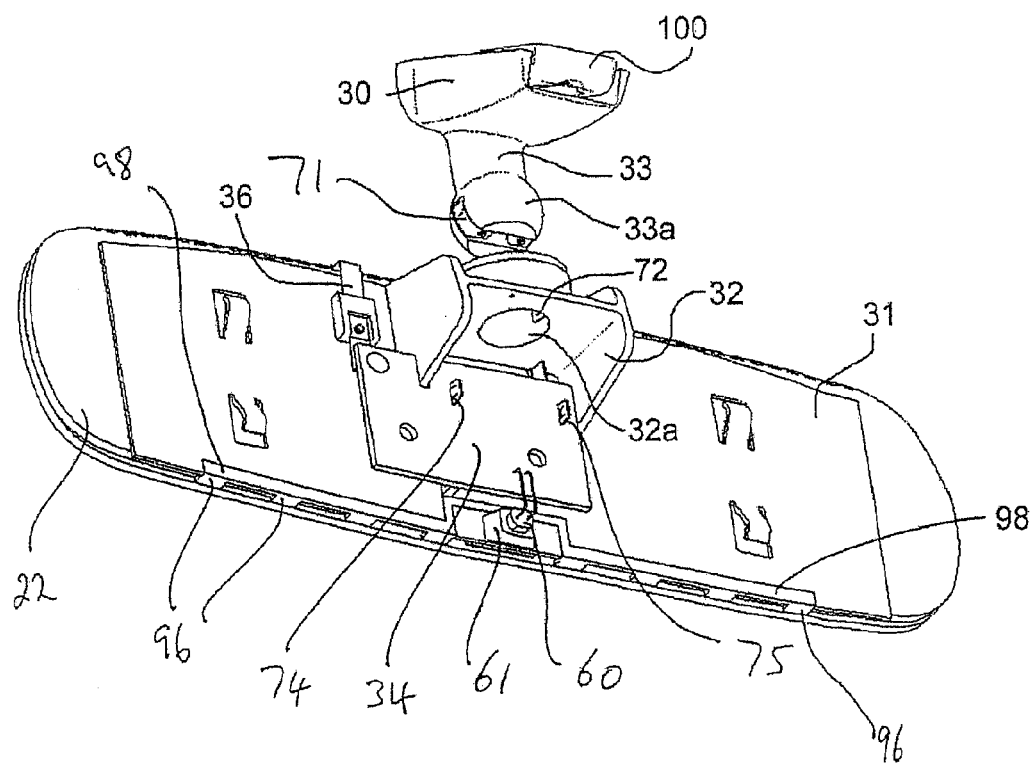
Figure 10:
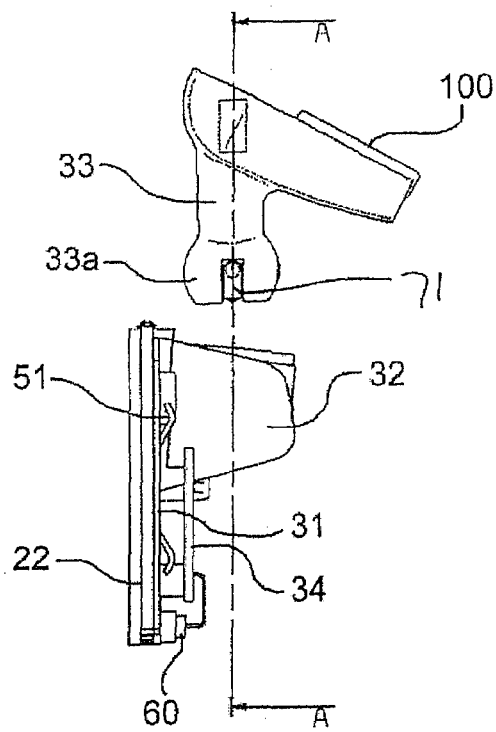
FIG. 10 is a side view of the mirror unit and bracket of FIGS. 8 and 9.
Figure 11:
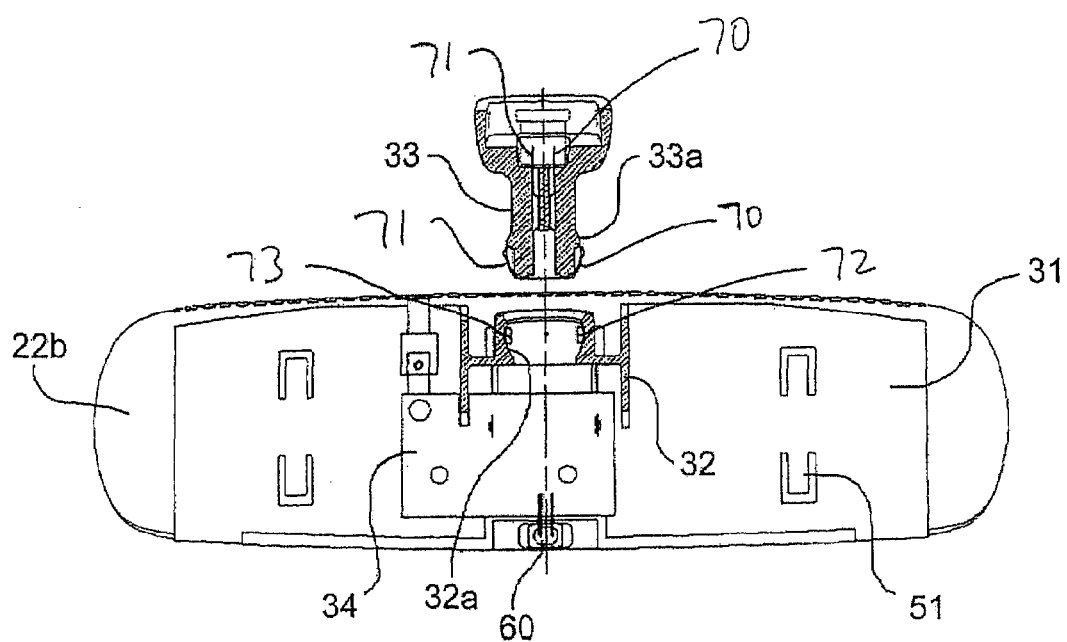
FIG. 11 is a cross sectional view of the mirror unit and bracket of FIGS. 8 and 9 taken on the line A-A of FIG. 10.
Figure 12:
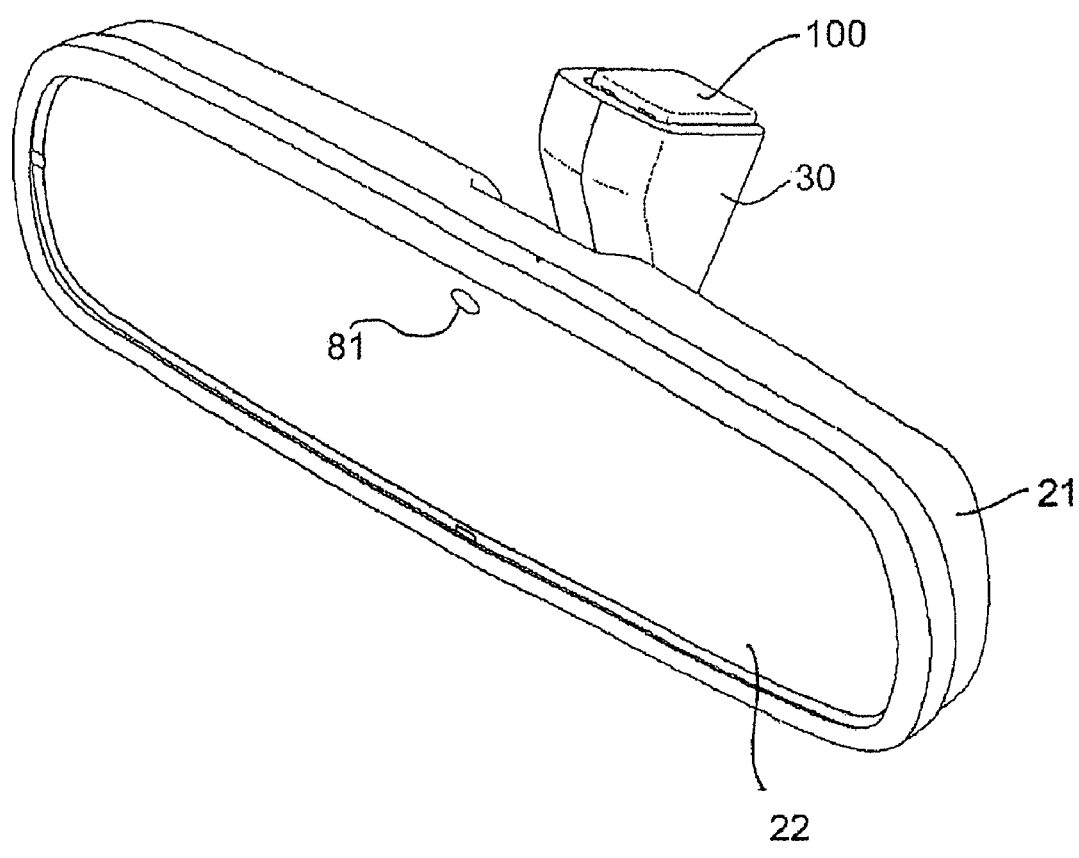
FIG. 12 is a front perspective view of another embodiment of rearview mirror assembly according to the invention.
Figure 13:
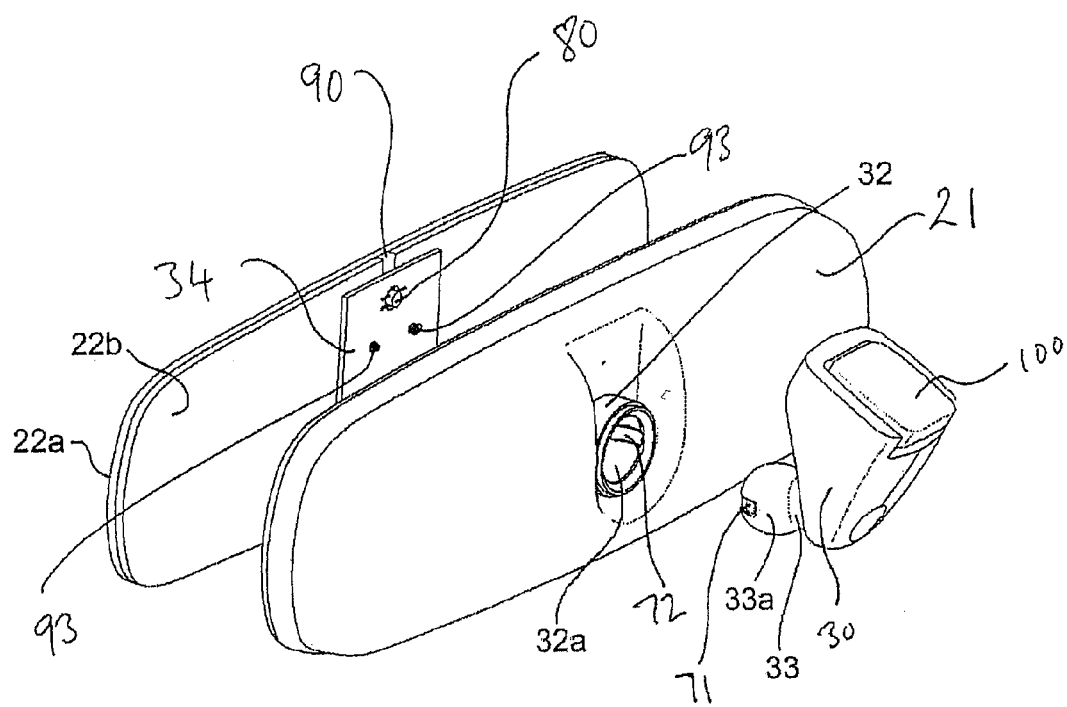
FIG. 13 is a exploded rear view of the rearview mirror assembly of FIG. 12.
Figure 14:
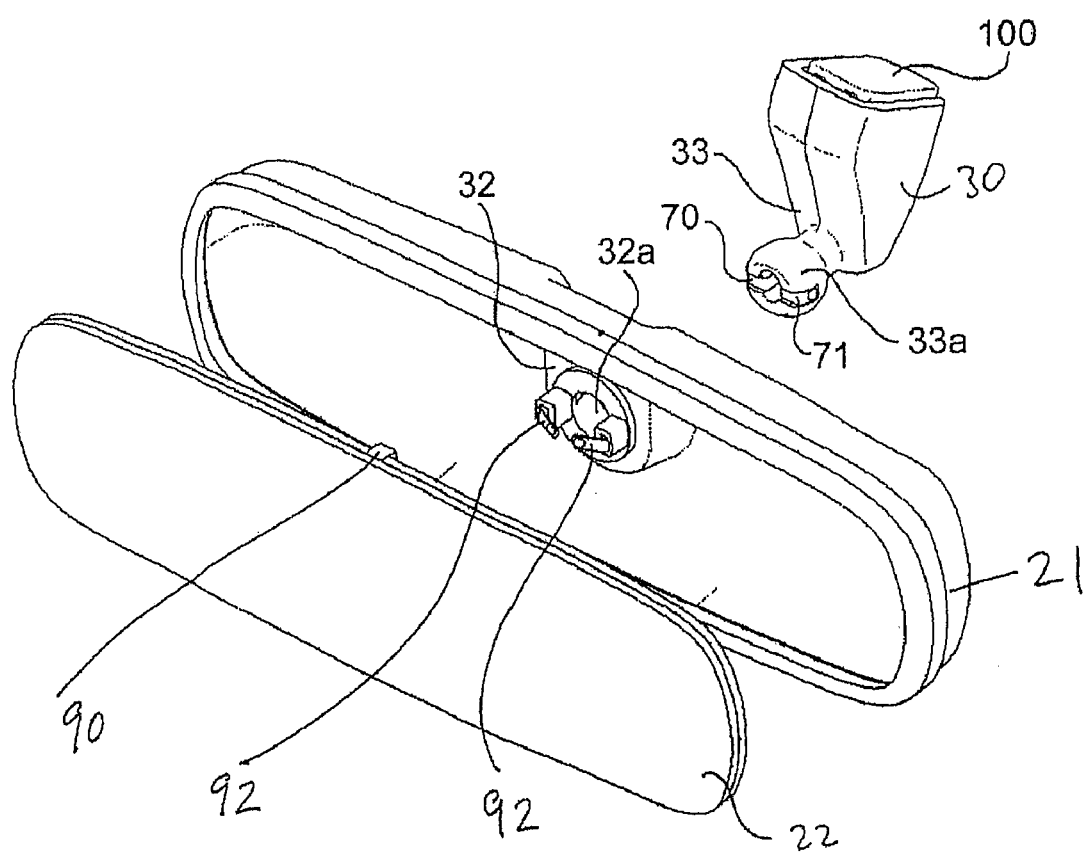
FIG. 14 is a exploded front view of the rearview mirror assembly of FIG. 12.

The front and rear plates 22a, 22b are the same size (except for a recess 25, FIG. 7a, provided in the bottom edge of the rear plate 22b for a purpose to be described) but have a small vertical offset, so that the upper edge of the rear plate 22b projects slightly above the upper edge of the front plate 22a, and correspondingly the lower edge of the front plate 22a projects slightly below the lower edge of the rear plate 22b. This offset is clearly seen in FIGS. 6 and 7. The reason for the offset is to expose a narrow strip of the conductive electrode layer on the inside surface of the rear plate 22b at the top of the mirror unit and a corresponding narrow strip of the conductive electrode layer on the inside surface of the front plate 22a at the bottom of the mirror unit. These exposed strips are electrically connected to conductive electrode contacts 38 and 39 respectively which are essentially elongated toothed clips having a generally U-shaped cross section and which clip over the exposed edges of the rear and front plates respectively.

The EC cell 22 is securely fixed by adhesive, clips or other suitable means to a non-conductive backplate 31 moulded, for example, for glass-filled polypropylene (PP) or nylon. A socket member 32 is mounted on the opposite side of the backplate 31 to the cell 22, i.e. on the rear side of the backplate, and is preferably formed integrally with the backplate. A dependent portion 33 of the bracket 30 forms a corresponding ball member. The ball and socket members 33, 32 interengage to form a pivot assembly, FIG. 6, such that a part-spherical external surface 33a of the ball member 33 is rotatable within a complementary part-spherical internal surface 32a of the socket member to allow a range of angular movement of the mirror unit relative to the bracket 30. The bracket 30 is preferably moulded from a different material to the backplate 31. For example, the bracket 30 can be moulded of nylon and the backplate of PP, or vice versa.

A printed circuit board (PCB) 34 includes an electrical circuit for controlling the operation of the EC cell 22, in particular by varying its reflectivity in response to the signals from a pair of light sensors 26 and 27 (e.g. photo-diodes or phototransistors) which are mounted on, but dependent via pairs of rigid conductors 26a and 27a from, the PCB. The PCB 34 is fixed by adhesive, clips or other suitable means to the rear side of the backplate 31, the electrical circuit being on the side of the PCB facing the backplate and therefore not visible in the drawings.

The backplate 31 has electrical contacts 36, 37 electrically connected to the electrode contacts 38, 39 of the EC cell. Contact pads 40 (FIG. 5) on the PCB 34 are connected to respective ones of the contacts 36, 37 and the electrical circuit on the PCB 34 supplies the variable control voltage across the EC cell 22 via the pads 40. A wire harness 41 provides a power supply to the PCB 34 from the vehicle power supply. The arrangement of the contact pads 40 and contacts 36, 37 eliminates the need for soldering, making the product easier to assemble. The preferred sizes of the front TEC glass and rear ITO(Ag) glass plates as referred to above results in a reduced size requirement for the electrodes 38, 39 of around 15% with consequent cost savings.

The backplate 31 has a boss 45 incorporating flared apertures 46, 47 (FIG. 4) for accommodating the light sensors 26, 27 respectively. The location of the sensors 26, 27 in the boss 45 provides very significant mechanical protection for the sensors and since the surface 50 of the front glass plate 22a is conductive an electrical path is available for discharge of electrostatic and other non-desirable electrical charges. Since the sensors 26, 27 are disposed rearwardly of the silvered rear glass plate 22b the bottom edge of the latter has a recess 25 relative to the front glass plate and the boss 45 is located in register with the recess 25. Thus the sensors 26, 27 are able to receive light through the front transparent glass plate 22a unobstructed by the rear glass plate 22b. The sensors 26, 27 face in the same direction in the boss 45, i.e. normal to the mirror unit 22 and generally facing the rear of the vehicle when the mirror assembly is mounted in the vehicle cabin for rearview viewing.

The bezel 23 has respective apertures 23a, 23b in front of the flared apertures 46, 47 in the boss 45. The bezel aperture 23b is located directly in front of the flared aperture 47 and sensor 27 so that the latter detects light directed along an axis generally normal to the EC cell 22. However, the bezel aperture 23a is laterally offset relative to the sensor 26 which, together with the skewed aspect of the flared aperture 46 seen in FIG. 4, ensures that the sensor 26 detects light directed laterally from one side of the axis normal to the cell, i.e. from the direction V, despite facing in the same direction as the sensor 27.

In use, when the mirror assembly is mounted for rearward viewing in the interior cabin of a vehicle, the sensor 27 senses light from the rear of the vehicle generally along a longitudinal axis of the vehicle while the sensor 26 senses light from the rear of the vehicle but obliquely to the right or to the left of the longitudinal vehicle axis. In particular, the sensor 26 senses light from a passenger or driver side window of the vehicle. Thus the sensor 27 acts as a glare sensor, since it is responsive to, for example, the glare from following headlamps, while the sensor 26 acts as an ambient sensor, since it is responsive to the general level of illumination outside the vehicle.

With both ambient and glare sensors facing rearwardly in the bezel 23 the housing 21 does not need to have an aperture for the ambient sensor 26, which conventionally faces forwardly.

The backplate 31 is also provided with resilient members 51 which abut and engage flanges 52 on the inside of the housing 21 and provide rigidity and assist in vibration minimization. This construction eliminates further components while maintaining a support function.

The direct connection between the bracket 30 and the backplate 31, which itself is directly fixed to the EC cell 22, improves the stiffness of the assembly that leads to an improvement in the vibration performance of the mirror and thus allows for the use of an all-plastic bracket support 30 which is a major reduction in the cost of the product. This also means that the mirror housing 21 is not required as a structural component and principally serves as a cosmetic shroud around the mirror unit. This allows a low cost plastic such as PP to be used. As stated, the PCB 34 clips onto the back plate 31 and has the glare sensor 27 and the ambient sensor 26 located together on the PCB 34. Thus the ambient sensor 26 does not need to extend through the rear of the mirror housing 21 and allows for the PCB 34 to be reduced in size and hence enables a cost reduction in the PCB. Since the backplate contains a support boss 45 for the sensors, this eliminates the need for other sensor supports and hence a reduction in the component count is achieved.

One of the advantages of the above embodiment is that the glare and ambient light sensors are configured so as to view via apertures in the bezel portion of the mirror assembly. This is particularly useful when additional accessories (such as are disclosed in U.S. Pat. Nos. 6,124,886, 6,245,262 and 6,222,460, the entire disclosures of which are hereby incorporated by reference herein) are included in the cavity of the mirror housing. By configuring both sensors to view via bezel-located apertures/view-ports, additional accessories/structures can be accommodated within the mirror housing cavity without concern for occluding a field of view of either sensor.

Rather than having a recess 25, the rear glass plate 22b may have a portion of its reflective coating removed to enable positioning of the light sensors and the bezel in register with the area of reflective coating which is absent. Alternatively, the rear glass plate can have a transflective portion such as is disclosed in U.S. Pat. No. 5,910,854, the entire disclosure of which is hereby incorporated by reference herein.

Furthermore, microlouvers or angle-of-incidence-transmission-dependent films such as are available from 3M could enable the sensor 26 to receive ambient light that is incident at an angle to the vehicle's longitudinal axis despite the sensor 26 facing in the same direction as the glare sensor 27. Alternatively, off-axis ambient light can be directed to the sensor 26 via a light pipe.

Figure 1:
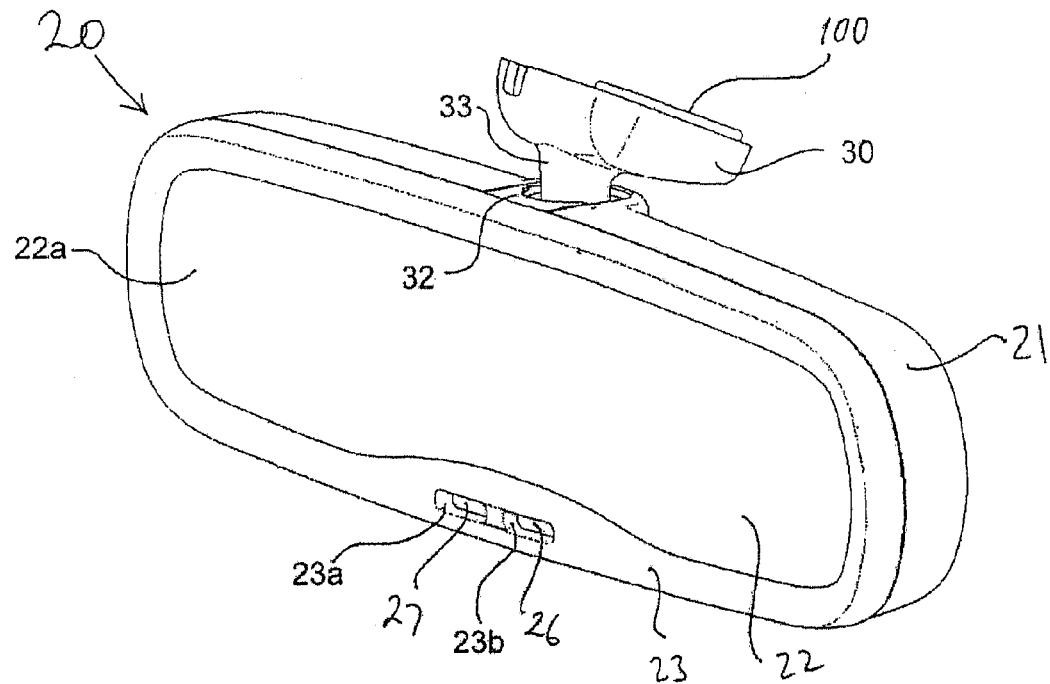
FIG. 1 is a front perspective view of a rearview mirror assembly according to one embodiment of the invention.
Figure 2:
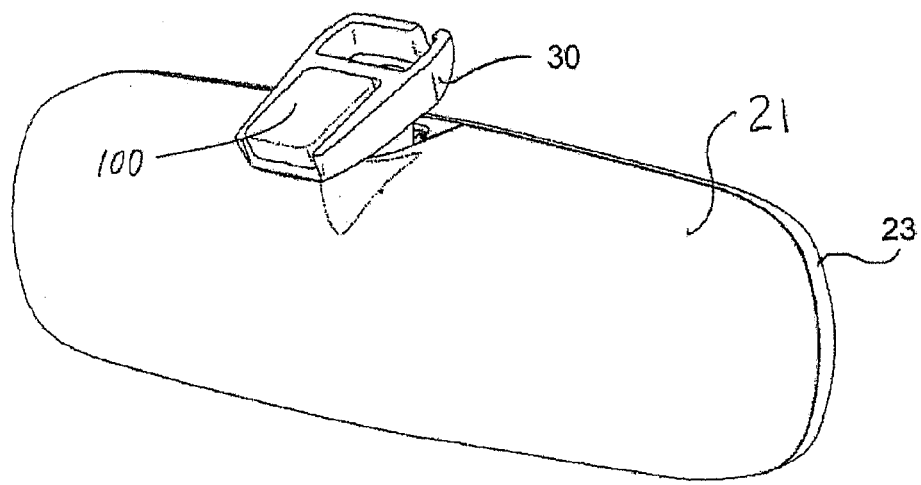
FIG. 2 is a rear perspective view of the mirror assembly of FIG. 1.
Figure 3:
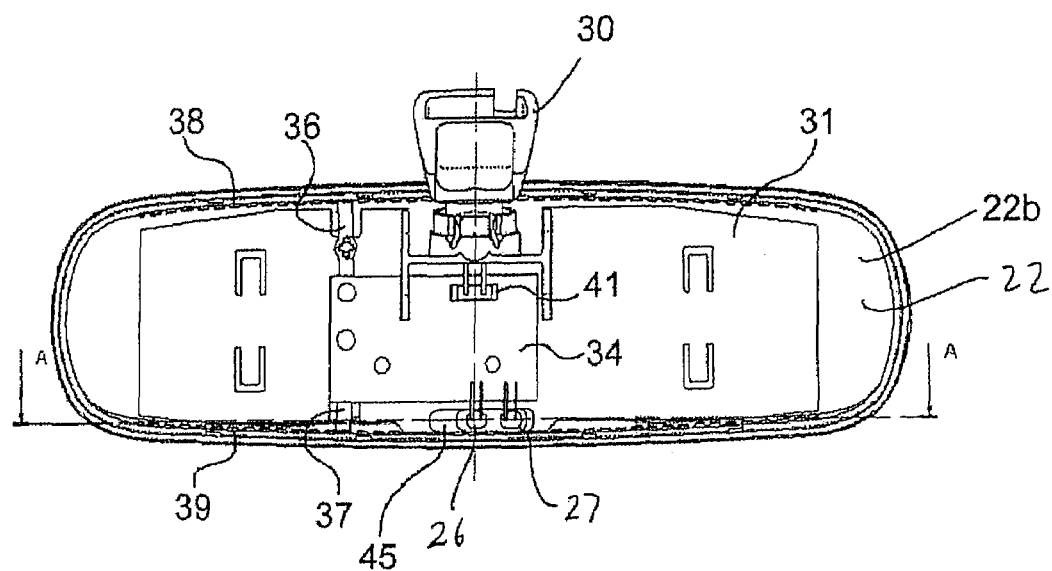
FIG. 3 is a rear view of the interior of the mirror of FIG. 1.
Figure 4:
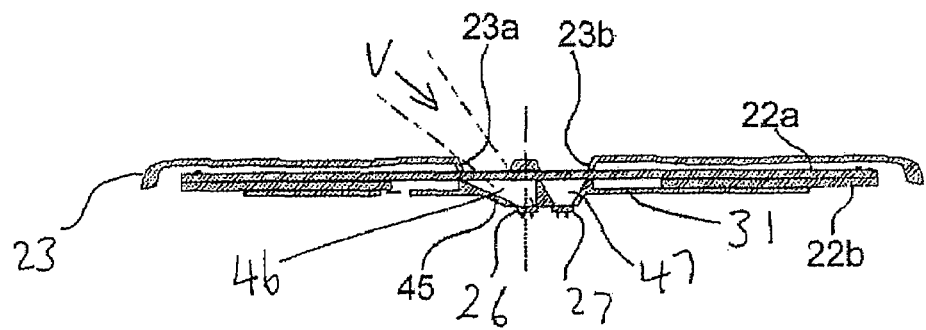
FIG. 4 is a cross sectional view of the mirror of FIG. 3 taken along the line A-A.
Figure 5:
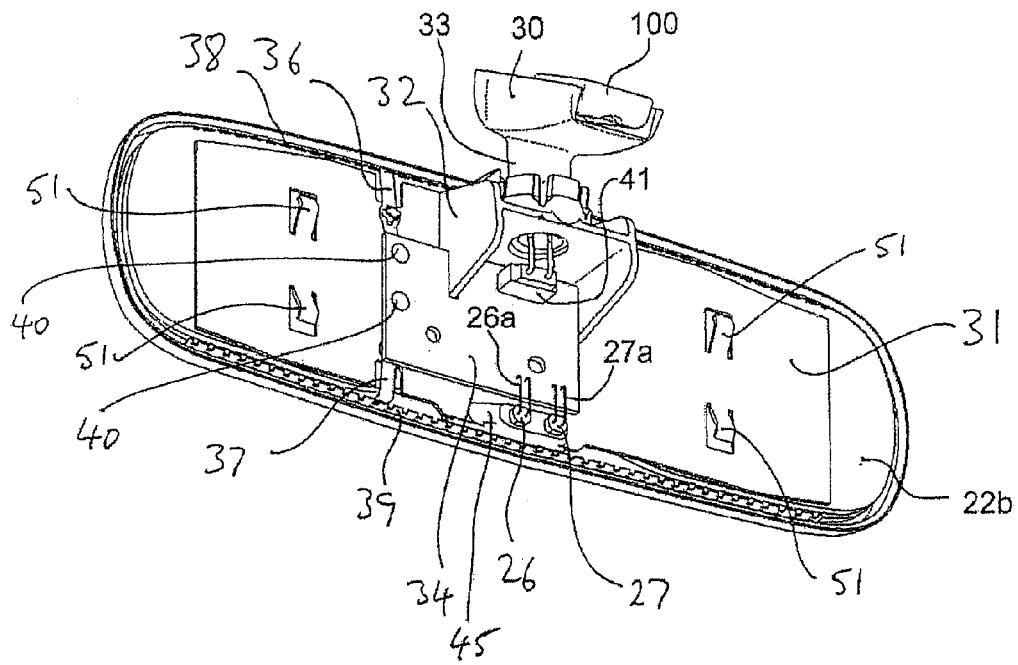
FIG. 5 is a rear perspective view of the mirror of FIG. 1 with the housing removed.

The above mirror assembly can be provided as an assembled kit but without the housing 21 (i.e. essentially as seen in FIG. 5). Such kit would comprise an EC cell, a PCB (including EC cell drive circuitry), a backplate, first and second light sensors, a bracket, and a bezel with first and second apertures therein, with the second aperture that corresponds to the second or ambient light sensor being so located when the kit is married to a mirror housing during assembly of the complete interior mirror assembly, the second photo sensor views sideways from the mirror assembly when it is mounted in the vehicle cabin, i.e. towards a driver-side or passenger-side front side window. This facilitates assembly of such kits in a central manufacturing location, and then their shipment to remote mirror assembly plants located, for example, overseas, where the assembled kit is married with a locally-made mirror housing, any additional accessories and an (optionally) locally-made mirror mount to form a complete interior rearview mirror assembly. Alternatively, the kit need not be assembled prior to shipment, and the entire assembly from the component parts could take place at the final mirror assembly site.

FIGS. 8 to 11 show another embodiment of the invention. In this embodiment similar numerals have been used for like parts as in the previous embodiment and only the differences between this embodiment and the embodiment of FIG. 1 will be described. In FIGS. 8 to 11 the housing 21 and bezel 23 are not shown.

In this embodiment only one light sensor 60 is used which integrates both the glare and ambient functions and this single sensor 60 is located in a boss 61 on the backplate 31 and will look through a single aperture (not shown) in the bezel 31.

In this embodiment electrical contacts 70, 71 are moulded into the ball member 33 and electrical contacts 72, 73 are moulded into the socket member 32. A portion of each of the contacts 70, 71 is exposed on the part-spherical external surface 33a of the ball member 33 and a portion of each of the contacts 72, 73 is exposed on the part-spherical internal surface 32a of the socket member 32. The orientation and positions of the portions of the electrical contacts 70-73 disposed on the part-spherical surfaces 32a and 33a is such that over a range of angular movement of the mirror unit 22 the contact 70 is in sliding engagement with the contact 72 and the contact 71 is in sliding engagement with the contact 73.

The contacts 70, 71 extend upwardly in the ball member 33 to the upper end of the bracket 30 for making electrical contact with the vehicle electrical supply. The contacts 72 and 73 in the socket member are electrically connected, by connectors not shown, to the PCB 34 at contacts 74, 75 respectively. The sliding engagement of the contacts 72, 73 with the contacts 70, 71 respectively, and the connection of the contacts 72, 73 with the PCB contacts 74, 75, supplies electrical power from the vehicle power supply to the PCB 34. This arrangement eliminates the need for a separate wire harness which reduces costs and enables the mirror to be assembled more easily.

In this embodiment the backplate 31 incorporates plastic tabs 96 which are coated with a conductive material, the conductive coating extending in a strip 98 along the bottom edge of the backplate 31 and being electrically connected to the PCB 34 in the region of the boss 61. The conductive tabs 96 resiliently press against the conductive surface of the front glass plate 22a to provide an electrical connection from the PCB 34 to the front glass plate 22a of the electrochromic cell 22. This design eliminates one electrode strip 39 off the EC cell 22 and results in a saving of around 54% of the cost of the electrode 39.

FIGS. 12 to 16 and 16a show a further embodiment of the invention. In this construction, the backplate 31 of the previous embodiment is not used and the PCB 34 is fixed by adhesive, clips or other suitable means directly to the rear plate 22b of the EC cell 22. Furthermore, only a single light sensor 80 is provided, in this embodiment near the top of the EC cell, a small area 81 of the reflective layer on the rear glass plate 22b being removed in register with the sensor 80 to allow the sensor to view through the transparent front glass plate 22a. Alternatively, the top edge of the rear glass plate 22b could be recessed, in a similar manner to that previously described for the recess 25 in the bottom edge, and the sensor 80 aligned with the recess. The PCB 34 is electrically connected to the top edge of the conductive electrode layer on one of the glass plates 22a, 22b of the EC cell 22 by an electrical contact 90.

In the case where the edge of the cell 22 has a conductive material it is sufficient for the contact 90 to abut the edge of the cell. In the case where the edge of the cell does not have a conductive material it is necessary for the contact 90 to be engaged or partly located between the front and rear glass sheets so as to make electrical connection with the relevant conductive electrode layer. The contact 90 is located in place during manufacture of the cell, and it is noted in this embodiment that the contact 90 may be a conductive tape foil or layer. A similar arrangement (not shown) is used at the bottom of the cell to make electrical contact with the conductive electrode layer on the other of the glass plates of the EC cell 22.

In this embodiment, due to the absence of the backplate 31, the socket 32 is moulded into the rear of the housing 21, but the same arrangement of slidably engaging electrical contacts 70, 71 and 72, 73 are provided on the ball member 33 and the socket member 31 respectively as previously described. At the inner surface of the socket 32 resilient electrical contacts 92, connected to the contacts 72, 73 respectively, engage respective electrical contacts 93 on the PCB 34 to provide an electrical connection between the power supply contacts 70, 71 and the PCB 34.

Figure 15:
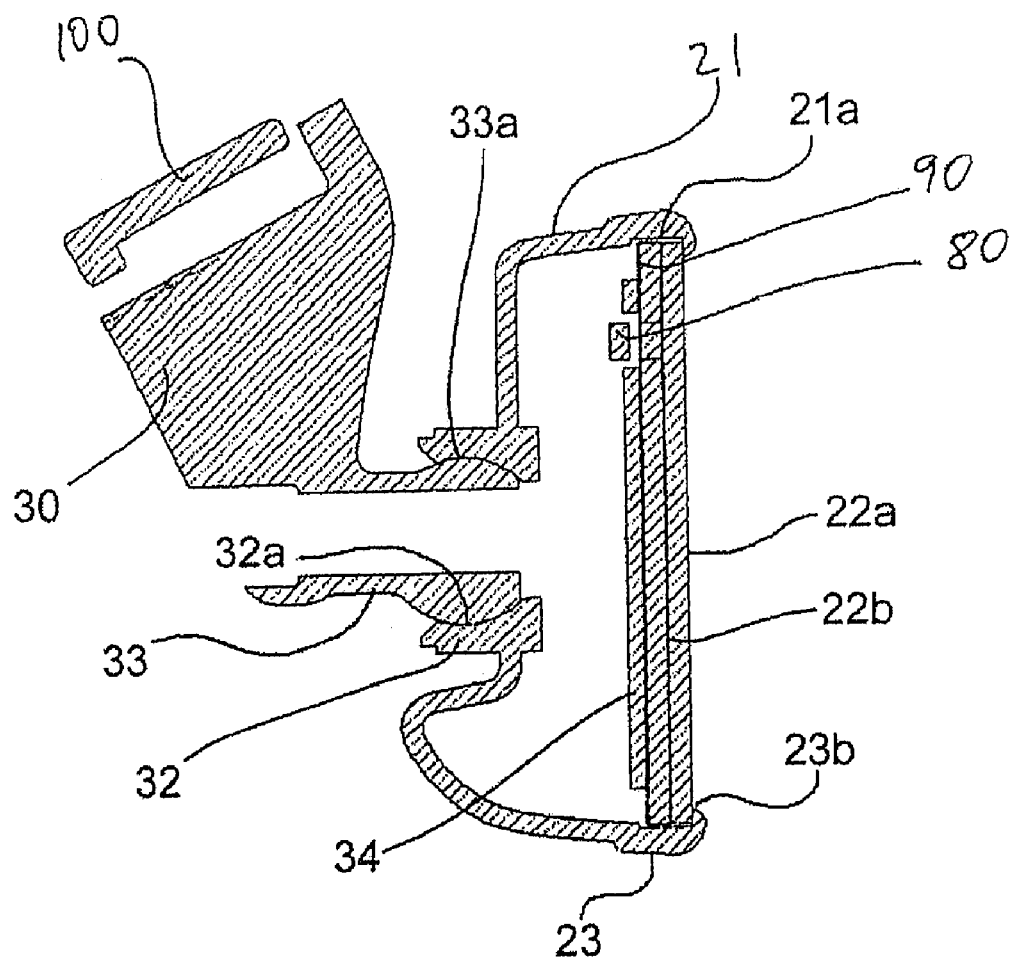

It will be noted from FIG. 15 that in this embodiment the front and rear glass plates 22a, 22b of the EC cell 22 are positioned in strict register with no vertical offset as is seen, for example, in FIGS. 6 and 7. This means that the height of the mirror can be greater than that in the previous embodiments leading to an even better product. In the embodiment of FIGS. 1 to 7 the height of the glass sheets is 61.5 mm and the visible height of the mirror glass to the vehicle driver is 53 mm. In the present embodiment the height of the glass is 59 mm and because there is no offset in the front and rear glass plates the height of the visible mirror is again 53 mm. Thus, less glass is used in this construction because of the lack of offset in the front and rear glass plates of the EC cell 22. In this case the number of TEC glass plates is increased by 25% and the number of ITO(Ag) glass plates is increased by 40% as compared with existing mirrors. Alternatively, if the height of the glass is maintained at 61.5 mm, the visible height of the mirror would be 2.5 mm greater at 55.5 mm leading to an even better product. In this embodiment therefore, the cost can be reduced further or the size of the product can be increased because of the absence of overlapping glass sheets. Also the cost of providing the electrodes 38, 39 used in the previous embodiments is eliminated.

Figure 16:
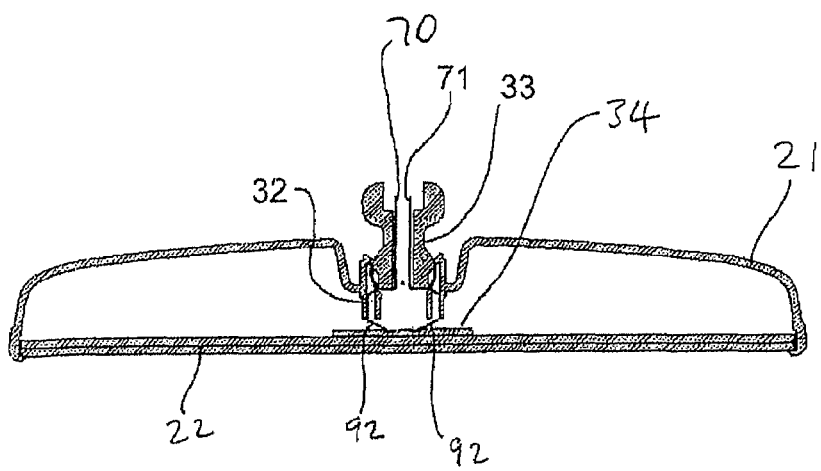
Figure 16A:
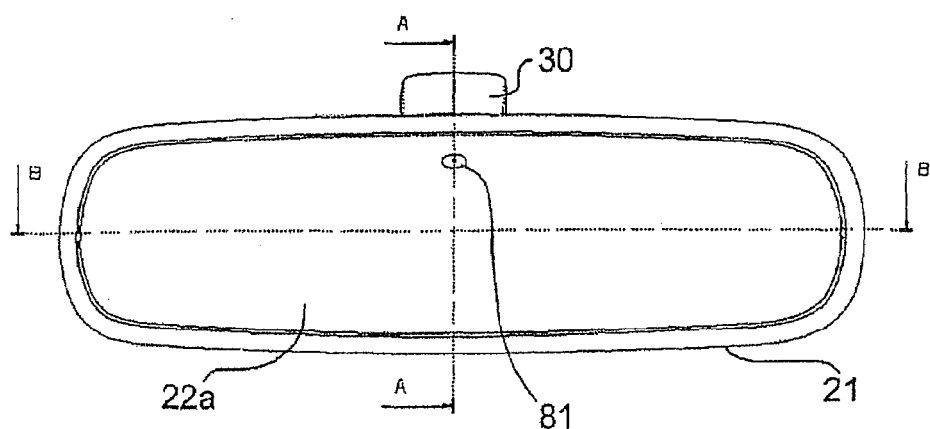
FIG. 16a is a front view of the rearview mirror assembly of FIG. 12.

It will be seen from FIGS. 15 and 16 that the housing 21 has no separate bezel 23, but rather the bezel 23 is integral with the main body of the housing 21. The integral bezel 23 defines a mirror viewing opening 23b which is slightly smaller than the lateral dimensions of the EC cell 22, as seen in FIG. 15. Therefore, in order to insert the EC cell 22 into the housing 21 the latter is warmed sufficiently to the resiliently soften the housing polymeric material (e.g. PP or nylon) but not sufficiently for the housing to lose its structural integrity. Then the EC cell 22 is inserted behind the bezel 23 while the housing 21 is still warm so that the edge of the EC cell is located in and gripped by a shallow recess 21a of the housing just behind the bezel. Thereafter the housing is allowed to cool and become rigid. This method of assembly has the advantage that a separate bezel is not required and the number of parts is reduced.

However, due to the need to get the EC cell 22 through the front opening in the housing 21, the lateral dimensions of the opening are only slightly less than the lateral dimensions of the EC cell. This means that in the assembled mirror the bezel overlaps the edges of the EC cell by only a small amount, typically 1.5 mm. This exposes the black epoxy lacquer seal which is conventionally coated around the edges of the glass plates and which extends partially onto the front surface of the front glass panel as a narrow strip several mm wide adjacent the edge. The exposed part of this seal, i.e. the part of the strip not covered by the bezel, will provide a cosmetic effect which can appear to the driver as part of the bezel itself.

Figure 17:
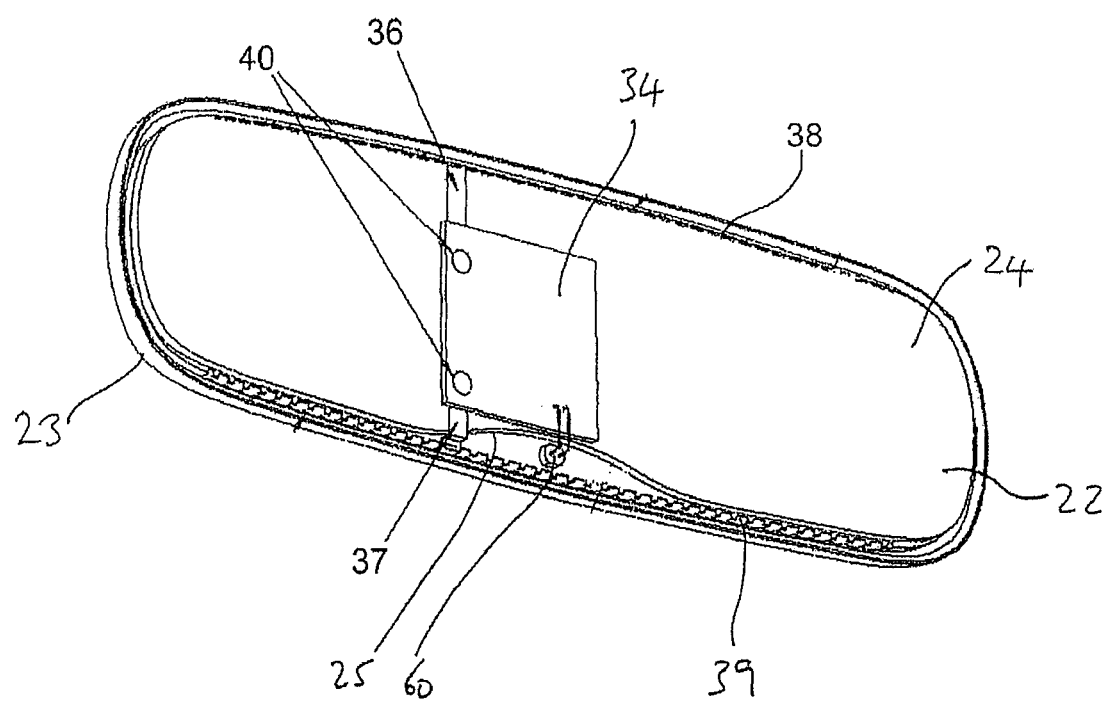
FIG. 17 is a rear perspective view of part of another embodiment of the invention.

FIG. 17 shows part of another embodiment of the invention in which the electrical contact 36, 37 are in the form of a conductive adhesive tape or coating for electrical connection to electrical contacts 40 on the PCB 34. This embodiment is a kind of hybrid of the embodiments of FIGS. 8-11 and 12-16, since it has a single sensor 60 like the embodiment of FIGS. 8-11 but the PCB 34 is mounted directly on the rear of the EC cell 22 like the embodiment of FIGS. 12-16. Alternatively there may be two light sensors as shown in relation to FIGS. 1-7. It wall be appreciated that the embodiment of FIG. 17 will have a housing 21 similar to that of FIGS. 12-16, i.e. the socket member 32 will be moulded to the rear of the housing.

FIGS. 19 to 24 show another embodiment of the invention. In this embodiment similar numerals have been used for like parts as in the previous embodiment. In FIGS. 19 to 24 the housing 21 and bezel 23 are not shown, but may be fitted as described for the embodiment of FIGS. 1 to 7.

As in the first embodiment, in the present embodiment the EC cell 22 is securely fixed by adhesive, clips or other suitable means to a non-conductive backplate 31 moulded, for example, from glass-filled polypropylene (PP) or nylon. A socket member 32 is mounted on the opposite side of the backplate 31 to the cell 22, i.e. on the rear side of the backplate, and is preferably formed integrally with the backplate. The socket member 32 engages with the ball member 33 of a support bracket 30 to allow angular adjustment of the EC cell 22. The PCB 34 is fixed by adhesive, clips or other suitable means to the rear side of the backplate 31, the electrical circuit being on the side of the PCB facing the backplate and therefore not being visible in FIGS. 19 and 20.

An electrically conductive lead frame 101, FIG. 22, is embedded in the backplate 31. The lead frame 101 is stamped from a flat phosphor bronze sheet and is embedded into the backplate 31 by moulding the latter around it, leaving certain contact and biasing fingers free of the moulded material as will be described. The lead frame comprises five electrically isolated portions A, B C, D and E (in actual fact, for ease of handling the four portions are initially joined by narrow bridges of phosphor bronze in the initial stamping but these are severed during or after the moulding process to isolate the four portions). The electrical functions of the five portions of the lead frame are:

Portion A: Power supply +12v
Portion B: Ground
Portion C: EC cell anode (+ve)
Portion D: EC cell cathode.
Portion E: Heat Sink.

The EC cell cathode can be −ve or ground, and in the latter case the lead frame portions B and D can remain connected within the lead frame to provide one large ground plane providing substantial EMC protection.

The lead frame fingers which are left free of and thus extend out of the moulded material of the backplate 31 are as follows (see also FIGS. 19-21):

Spring contacts 102a, 102b which are bent upwardly out of the plane of the lead frame to bear resiliently against respective electrical contacts 134a, 134b on the ball member 33. These connect respectively to power (+12v) and ground of the vehicle electrical supply via the bracket 30 as will be described.

Spring contacts 104a, 104b which are bent upwardly out of the plane of the lead frame to bear resiliently against respective electrical contacts strips 106a, 106b (FIG. 21) on the side of the PCB 34 facing the backplate 31. These transfer the power and ground of the vehicle electrical supply to the PCB 34 via the lead frame portions A and B.

Spring contacts 108a, 108b which are bent upwardly out of the plane of the lead frame to bear resiliently against respective electrical contacts strips 110a, 110b (FIG. 21) on the side of the PCB 34 facing the backplate 31. These receive the EC cell anode and cathode voltages from the PCB 34 for control of the EC cell reflectivity.

A spring contact 108c which is bent upwardly out of the plane of the lead frame to make large area contact with the PCB 34 to dissipate heat from copper tracks and heat generating components on the "hottest" area of the PCB. The portion E thereby constitutes an efficient heat sink.

A plurality of contact fingers 112 (the outer pair of each group of three seen at the bottom of FIG. 22) which are bent through 90 degrees at their outer ends to engage the conductive electrode layer on the inside surface of the front glass plate 22a (the front and rear glass plates 22a, 22b are slightly offset as in the first embodiment). These apply the EC cell anode voltage from the contact 108a via the lead frame portion C.

A pair of contact fingers 114 which are bent through 90 degrees at their outer ends to engage the conductive electrode layer on the inside surface of the rear glass plate 22b. These apply the EC cell cathode voltage from the contact 108b via the lead frame portion D.

A plurality of spring fingers 116 which are bent out of the plane of the lead frame from the portions B, C and D to bear resiliently against the interior of the mirror housing 21 (not shown) to stabilise the EC cell 22 within the housing (at the bottom of the lead frame the spring fingers 116 are the centre fingers of each group of three).

This embodiment again uses ambient and glare light sensors 26, 27 although in this case they are surface mounted on the PCB 34 rather than depending from it. As before, the glare sensor 27 faces rearwardly of the vehicle when the mirror is mounted in the vehicle cabin and views through the transparent front glass plate 22a of the EC cell via a recess 25 in the edge of the rear glass plate 22b. However, the ambient sensor 26 in this case faces forwardly (relative to the vehicle) and views forwardly of the vehicle through an aperture 120 in the PCB 34 and a corresponding aperture (not shown) in the mirror housing. When the PCB 34 is mounted on the backplate 31 the sensors 26 and 27 sit in respective apertures in a housing 122 moulded to the backplate 31, the housing both mechanically protecting the sensors and shielding them from extraneous light. Alternatively, a single light sensor may be positioned so that it is shrouded from stray light by a feature of the backplate, receives glare light though an aperture in the bezel and through the recess in the rear glass and receives ambient light from the opposite direction through a hole in the PCB and an aperture in the mirror housing. This one sensor can monitor both ambient and glare light levels. Where two sensors are used, mounting them close together on the PCB 34 reduces adverse EMC effects by eliminating long conductive lines between the sensors.

Figure 24:
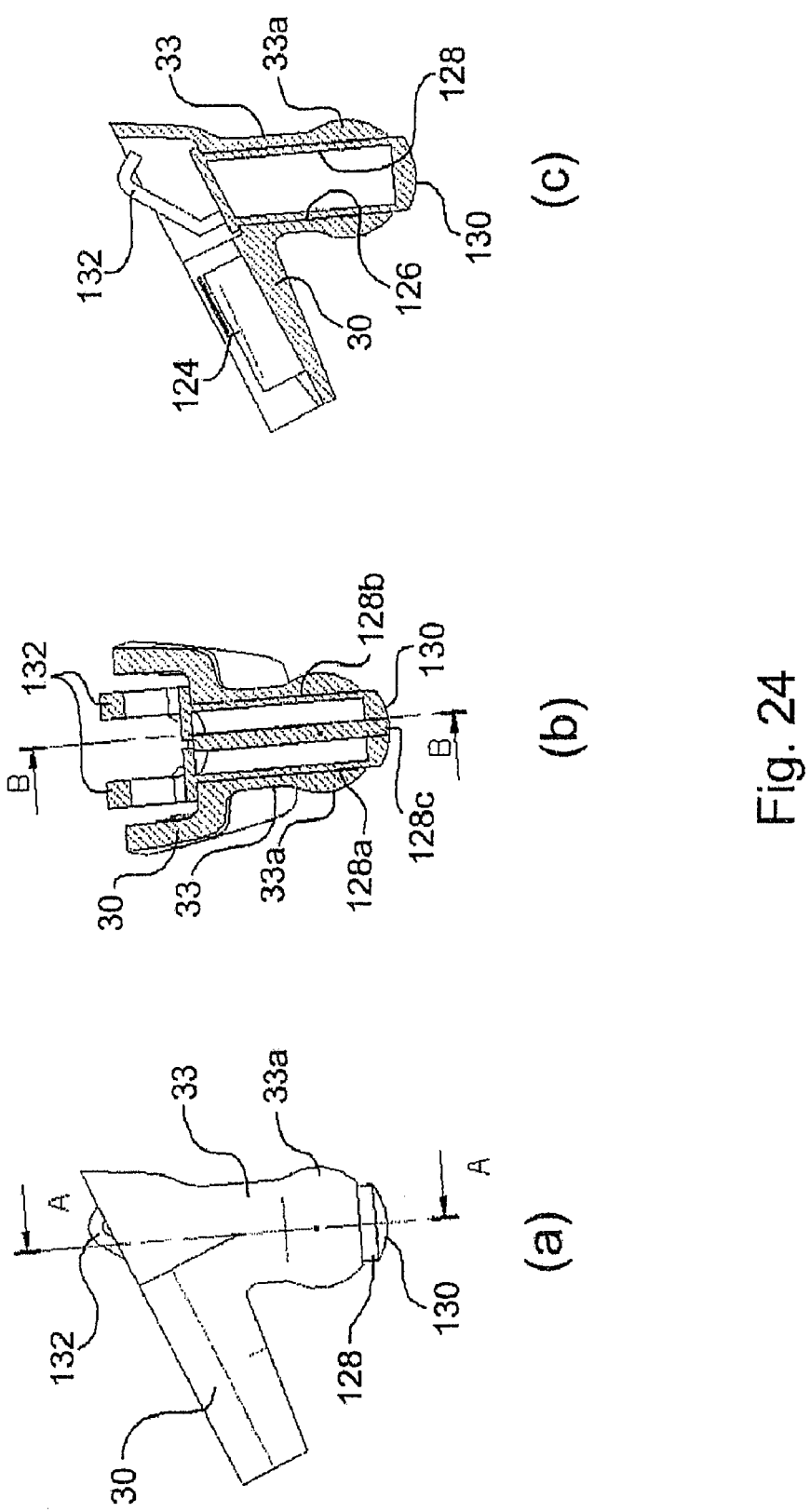

The bracket 30, FIGS. 23 and 24, is (except as noted below) moulded from glass-filled polypropylene (PP) or nylon. It has an upper end with internal rails 124 for sliding engagement with a "button"-type mirror mount 100 for attachment of the bracket to the interior surface of a vehicle windscreen in conventional manner. The bracket 30 further includes a ball member 33 which depends from the upper end of the bracket and has a part-spherical external surface 33a rotatable within a complementary part-spherical internal surface 32a (FIG. 20) of the socket member 32 to allow a range of angular movement of the EC mirror unit 22 relative to the bracket 30.

The ball member 33 comprises a central cylindrical bore 126 and a cylindrical body 128 of electrically insulating material extending fully through the bore 126 from the upper end of the bracket and terminating in an exposed convex surface 130 below the lower end of the bore. The body 128 comprises three parts: two outer generally semi-cylindrical parts 128a, 128b separated by a central planar part 128c. At the upper end of the bracket the parts 128a, 128b have respective integral spring arms 132, and at the lower and of the body 128 all three parts collectively define the convex surface 130.

The outer surfaces of the semi-cylindrical parts 128a, 128b are plated with an electrically coating, the coating on each part extending onto the convex surface 130 to form respective electrical contacts 134a, 134b and from there each coating extends continuously along the length of the part 128a or 128b to the upper end of the bracket and onto the top surface of the respective spring arm 132. Thus a direct electrical path is made from each electrical contact 134a, 134b on the convex surface 130 to a respective one of the spring arms 132. The central part 128c, which is not conductively coated, prevents any short circuit between the two paths.

When the upper end of the bracket 30 is mounted to a mounting button 100 the spring arms 132 engage conductive tracks (not shown) on the inside surface of the windscreen, such tracks providing vehicle power and ground which are thereby transferred to the respective contacts 134a, 134b via the conductive coatings on the sides of the body 128. The contacts 134a, 134b are slidingly engaged by the lead frame spring contacts 102a, 102b over a range of angular movement of the EC cell 22 for supplying power to the PCB 34 from the vehicle electrical system.

The body 128 may be manufactured in three pieces 128a, 128b and 128c which are slid side-by-side into the bore 126 as indicated for the part 128b in FIG. 23(a). In such a case the outer parts 128a and 128b are preferably hollow (as shown for the part 128b) and individually moulded of polysulphide or other electroplatable material and subsequently plated with conductive coatings. The centre part 128c can be moulded of the same material but left unplated, or it can be moulded, like the rest of the bracket 10, of a polymeric material such as PP or nylon. However, a two-shot moulding process may be used. In the first shot, the central part 128c is moulded using a material which cannot be electroplated. Then, in the second shot, the outer semi-cylindrical parts 128a and 128b are moulded to opposite sides of the centre part 128c but using a material such as polysulphide which can be plated. Then the entire body 128 is subject to electroplating, but the plating only "takes" to the outer parts 128a and 128b.

Figure 25:
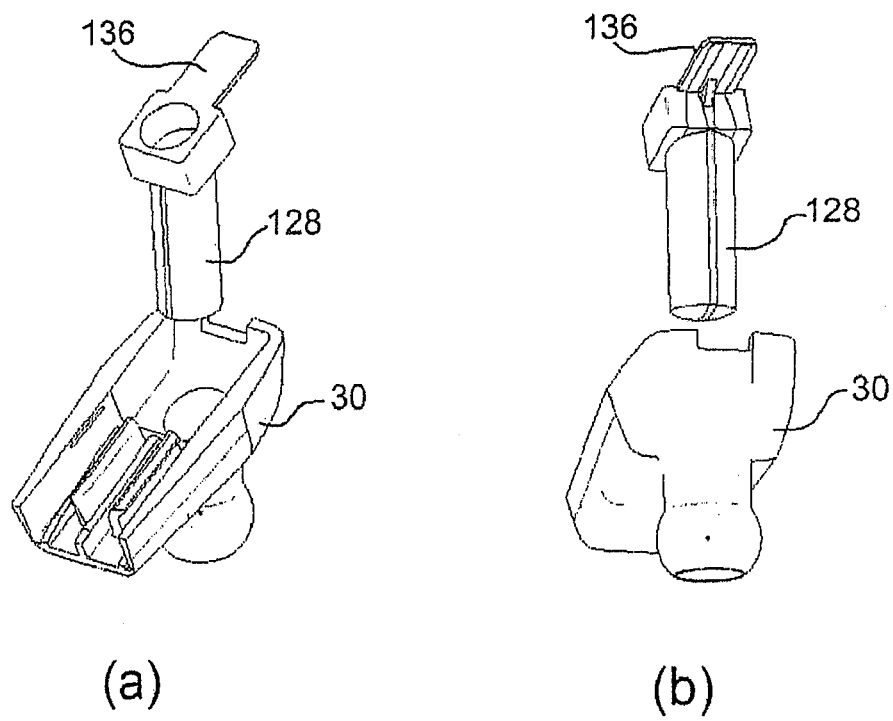

In an alternative embodiment of the bracket 30, FIG. 25, the spring contacts 132 are replaced by a plug 136 of a standard plug and socket connector and the conductive coatings on the body 128 extend onto the plug 136.

In a modification of the above embodiment, the body 128 could comprise more than two independently plated parts 128a, and 128b, e.g. three such parts each subtending an angle of about 120 degrees at the centre and each insulated from the others. In such a case two of the parts would provide power and ground connections for the PCB, while the third part could provide a data connection to other equipment mounted in the mirror housing.

Alternatively, FIG. 26, the data connection could be provided by a solid conductor 134c embedded in and extending the full length of the central part 128c. The surface of the conductor 134c exposed at the lower end of the part 128c could be slidingly engaged by a further spring contact extending from the lead frame, similar to the contacts 102a, 102b. In all embodiments of bracket, however, cooperating stop means (not shown) on or in the ball member 33 and socket member 32 respectively are designed to limit the degree of angular adjustment of the mirror to ensure that each spring contact remains in engagement with its respective contact on the lower end of the body 128.

The invention is not limited to the embodiments described herein which may be modified or varied without departing from the scope of the invention.

The invention claimed is:

1. An interior rearview mirror assembly for a vehicle, said interior rearview mirror assembly comprising:

an electro-optic mirror unit whose reflectivity is variable in response to an electrical voltage applied thereto, said electro-optic mirror unit comprising a first substrate and a second substrate with an electro-optic medium sandwiched therebetween;

said mirror unit providing a rearward field of view to a driver of a vehicle when said interior rearview mirror assembly is mounted in the vehicle;

said first substrate being closer to the driver of the vehicle than said second substrate when said interior rearview mirror assembly is mounted in the vehicle;

said first substrate having a first surface and a second surface, said first surface being closer to the driver of the vehicle than said second surface when said interior rearview mirror assembly is mounted in the vehicle, said first substrate having a transparent electrical conductor disposed at said second surface of said first substrate, said first substrate having a first perimeter edge about a periphery of said first substrate and between said first and second surfaces;

a bezel disposed at least partially in front of said mirror unit and encompassing said first perimeter edge, an overlapping portion of said bezel overlapping a perimeter region of said first surface;

said second substrate having a third surface and a fourth surface, said third surface being closer to the driver of the vehicle than said fourth surface when said interior rearview mirror assembly is mounted in the vehicle, said second substrate having a mirror reflector disposed at said third surface of said second substrate, said second substrate having a second perimeter edge about a periphery of said second substrate and between said third and fourth surfaces;

said second perimeter edge comprising a recess that is recessed relative to a corresponding region of said first perimeter edge when said first and second substrates are assembled together to sandwich said electro-optic medium therebetween, a front surface portion of said corresponding region of said first perimeter edge being at least partially overlapped by said overlapping portion of said bezel; and at least one sensor disposed behind said first substrate and operable to receive light through at least one aperture in said overlapping portion of said bezel and through said first substrate and unobstructed by said second substrate.

2. The interior rearview mirror assembly of claim 1, wherein said overlapping portion of said bezel is at a lower region of said mirror unit when said mirror assembly is mounted to the vehicle.

3. The interior rearview mirror assembly of claim 1 further comprising an electrical circuit element disposed at or behind said fourth surface of said second substrate.

4. The interior rearview mirror assembly of claim 3, wherein said electrical circuit element is operable to control operation of said mirror unit in response to said at least one sensor.

5. The interior rearview mirror assembly of claim 4, wherein said electrical circuit element is disposed at a backplate of said mirror unit, said mirror unit being mounted to said backplate.

6. The interior rearview mirror assembly of claim 5, wherein said electrical circuit element is electrically connected to said mirror unit by contacts extending out of said backplate.

7. The interior rearview mirror assembly of claim 5, wherein said backplate includes a support for pivotally mounting said mirror unit in the vehicle.

8. The interior rearview mirror assembly of claim 1 further comprising a bracket for supporting said rearview mirror assembly from an interior portion of the vehicle.

9. The interior rearview mirror assembly of claim 8, wherein said bracket connects to said mirror unit via a ball and socket pivot assembly, said ball being fixed relative to said bracket and said socket being fixed relative to said mirror unit.

10. The interior rearview mirror assembly of claim 9, wherein said pivot assembly includes a plurality of electrical contacts and counter-contacts for supplying electrical power to an electrical circuit element of said mirror assembly from a vehicle electrical system external to said mirror assembly, the power being provided to said electrical circuit element over a range of angular movement of said mirror unit relative to said bracket.

11. The interior rearview mirror assembly of claim 10, wherein said ball comprises a convex surface, said electrical contacts being disposed at said convex surface.

12. The interior rearview mirror assembly of claim 1, wherein said electro-optic mirror unit comprises an electrochromic mirror unit.

13. The interior rearview mirror assembly of claim 1, wherein said first substrate is substantially the same size as said second substrate.

14. The interior rearview mirror assembly of claim 1, wherein said first substrate is offset relative to said second substrate.

15. An interior rearview mirror assembly for a vehicle, said interior rearview mirror assembly comprising:

an electro-optic mirror unit whose reflectivity is variable in response to an electrical voltage applied thereto, said electro-optic mirror unit comprising a first substrate and a second substrate with an electro-optic medium sandwiched therebetween;

said mirror unit providing a rearward field of view to a driver of a vehicle when said interior rearview mirror assembly is mounted in the vehicle;

said first substrate being closer to the driver of the vehicle than said second substrate when said interior rearview mirror assembly is mounted in the vehicle;

said first substrate having a first surface and a second surface, said first surface being closer to the driver of the vehicle than said second surface when said interior rearview mirror assembly is mounted in the vehicle, said first substrate having a transparent electrical conductor disposed at said second surface of said first substrate, said first substrate having a first perimeter edge about a periphery of said first substrate and between said first and second surfaces;

said second substrate having a third surface and a fourth surface, said third surface being closer to the driver of the vehicle than said fourth surface when said interior rearview mirror assembly is mounted in the vehicle, said second substrate having a mirror reflector disposed at said third surface of said second substrate, said second substrate having a second perimeter edge about a periphery of said second substrate and between said third and fourth surfaces;

said second perimeter edge comprising a recessed edge portion that is recessed relative to a corresponding edge portion of said first perimeter edge when said first and second substrates are assembled together to sandwich said electro-optic medium therebetween; and at least one sensor disposed behind said first substrate and generally at said recessed edge portion, said at least one sensor being operable to receive light through said first substrate and unobstructed by said second substrate.

16. The interior rearview mirror assembly of claim 15 further comprising a bezel disposed at least partially in front of said mirror unit and encompassing said first perimeter edge, an overlapping portion of said bezel overlapping a perimeter region of said first surface and being disposed in front of said at least one sensor.

17. The interior rearview mirror assembly of claim 16, wherein said at least one sensor is operable to receive light through at least one aperture in said overlapping portion of said bezel.

18. The interior rearview mirror assembly of claim 16 further comprising a housing, said bezel retaining said mirror unit in said housing.

19. An interior rearview mirror assembly for a vehicle, said interior rearview mirror assembly comprising:

an electrochromic mirror unit whose reflectivity is variable in response to an electrical voltage applied thereto, said electrochromic mirror unit comprising a first substrate and a second substrate with an electrochromic medium sandwiched therebetween;

said mirror unit providing a rearward field of view to a driver of a vehicle when said interior rearview mirror assembly is mounted in the vehicle;

said first substrate being closer to the driver of the vehicle than said second substrate when said interior rearview mirror assembly is mounted in the vehicle;

said first substrate having a first surface and a second surface, said first surface being closer to the driver of the vehicle than said second surface when said interior rearview mirror assembly is mounted in the vehicle, said first substrate having a transparent electrical conductor disposed at said second surface of said first substrate, said first substrate having a first perimeter edge about a periphery of said first substrate and between said first and second surfaces;

said second substrate having a third surface and a fourth surface, said third surface being closer to the driver of the vehicle than said fourth surface when said interior rearview mirror assembly is mounted in the vehicle, said second substrate having a mirror reflector disposed at said third surface of said second substrate, said second substrate having a second perimeter edge about a periphery of said second substrate and between said third and fourth surfaces;

said second perimeter edge comprising a recessed edge portion that is recessed relative to a corresponding edge portion of said first perimeter edge when said first and second substrates are assembled together to sandwich said electrochromic medium therebetween; and at least one sensor disposed behind said first substrate and generally at said recessed edge portion, said at least one sensor being operable to receive light through said first substrate and unobstructed by said second substrate.

20. The interior rearview mirror assembly of claim 19, wherein said at least one sensor is operable to receive light through at least one aperture in a bezel of said mirror assembly.

* * * * *